US012654685B1

(12) United States Patent　(10) Patent No.: US 12,654,685 B1

Holenstein et al.　(45) Date of Patent: Jun. 16, 2026

(54) METHODS FOR DYNAMICALLY IMPROVING DRIVING PERFORMANCE OF A MOVING MULTI-TRACK VEHICLE THAT IS TRAVERSING A LAND SURFACE

(71) Applicant: Gravic, Inc., Malvern, PA (US)

(72) Inventors: Dylan R. Holenstein, Newtown Square, PA (US); Bruce D. Holenstein, Media, PA (US); Ethan E. Golden, West Chester, PA (US)

(73) Assignee: GRAVIC , INC., Malvern, PA (US)

( * ) Notice: Subject to any disclaimer, the term of this patent is extended or adjusted under 35 U.S.C. 154(b) by 0 days.

(21) Appl. No.: 19/364,928

(22) Filed: Oct. 21, 2025

Related U.S. Application Data

(63) Continuation-in-part of application No. 18/595,841, filed on Mar. 5, 2024, now abandoned.

(51) Int. Cl.
　B60W 30/045 (2012.01)
　B60W 40/114 (2012.01)
　B60W 50/00 (2006.01)
(52) U.S. Cl.
　CPC ........ B60W 30/045 (2013.01); B60W 40/114 (2013.01); B60W 50/0097 (2013.01);
　(Continued)
(58) Field of Classification Search
　CPC ............. B60W 30/045; B60W 40/114; B60W 50/0097; B60W 2520/14; B60W 2520/26; B60W 2710/20
　See application file for complete search history.

(56) References Cited

U.S. PATENT DOCUMENTS 5,601,346 A * 2/1997 Lustenberger ......... B62D 37/06
　　　　　　　　　　　　　　　303/177
5,826,829 A 10/1998 Holmes
　　　　　(Continued)

FOREIGN PATENT DOCUMENTS

JP　　　H08310364 A * 11/1996
JP　　　H09145552 A * 6/1997

OTHER PUBLICATIONS

Reaction Wheels vs. Momentum wheels, posting on Space Exploration Stack Exchange, posted on web page: https://space.stackexchange.com/questions/25658/reaction-wheels-vs-momentum-wheels, printout date: Dec. 28, 2023, initial posting date: 2018 and 2020, 4 pages.

(Continued)

*Primary Examiner* — Daniel M. Robert
(74) *Attorney, Agent, or Firm* — Clark A. Jablon

(57) ABSTRACT

Methods are provided for dynamically improving driving performance of a moving vehicle that is traversing a land surface using a flywheel, an active element, and a controller. The controller predicts the directional change of the moving vehicle, detects initiation of the predicted directional change of the moving vehicle, determines or estimates an incremental directional change of the moving vehicle that is currently needed to navigate a portion of the predicted directional change, and controls the active element to slow down or further spin up the flywheel to reduce traction that is needed between the wheels of the vehicle and the land surface to navigate the determined incremental directional change of the moving vehicle. The flywheel is maintained in a fixed orientation with respect to the body of the moving vehicle during the spinning up or slowing down of the flywheel. Torque applied by the active element to slow down or further spin up the flywheel is proportionate to the yaw torque applied on the body of the moving vehicle, and is applied in a direction that reduces the traction that is needed between (Continued)

the wheels of the vehicle and the land surface to navigate the determined incremental directional change of the moving vehicle. These steps are repeated for subsequent portions of the predicted directional change of the moving vehicle, thereby dynamically improving driving performance of the moving vehicle that is traversing the land surface.

27 Claims, 15 Drawing Sheets

(52) U.S. Cl.
CPC ..... *B60W 2520/14* (2013.01); *B60W 2520/26* (2013.01); *B60W 2710/20* (2013.01)

(56) References Cited

U.S. PATENT DOCUMENTS

| | | | |
|---|---|---|---|
| 8,117,930 | B2 | 2/2012 | Adams et al. |
| 9,702,443 | B2 | 7/2017 | Erlston et al. |
| 11,332,204 | B2 | 5/2022 | Kim et al. |
| 2008/0234877 | A1 | 9/2008 | Kimura |
| 2009/0088918 | A1 | 4/2009 | Takenaka |
| 2009/0254251 | A1 | 10/2009 | Sato |
| 2011/0163516 | A1 | 7/2011 | Whinnery |
| 2013/0274995 | A1 | 10/2013 | Kim |
| 2015/0224845 | A1* | 8/2015 | Anderson ............... F03G 7/081 |
| | | | 701/37 |
| 2018/0257720 | A1 | 9/2018 | Kim |
| 2019/0283734 | A1 | 9/2019 | Katsuyama |
| 2022/0340198 | A1 | 10/2022 | Chang |
| 2023/0021635 | A1 | 1/2023 | Gallagher et al. |

OTHER PUBLICATIONS

How Gyros Create Stabilizing Torque, Whitepaper 1403, Veem Gyro, 2014, 13 pages.

* cited by examiner

Center of
Curvature for Turn

Required
Rotation of
Body of Vehicle

↓

Figure 2:
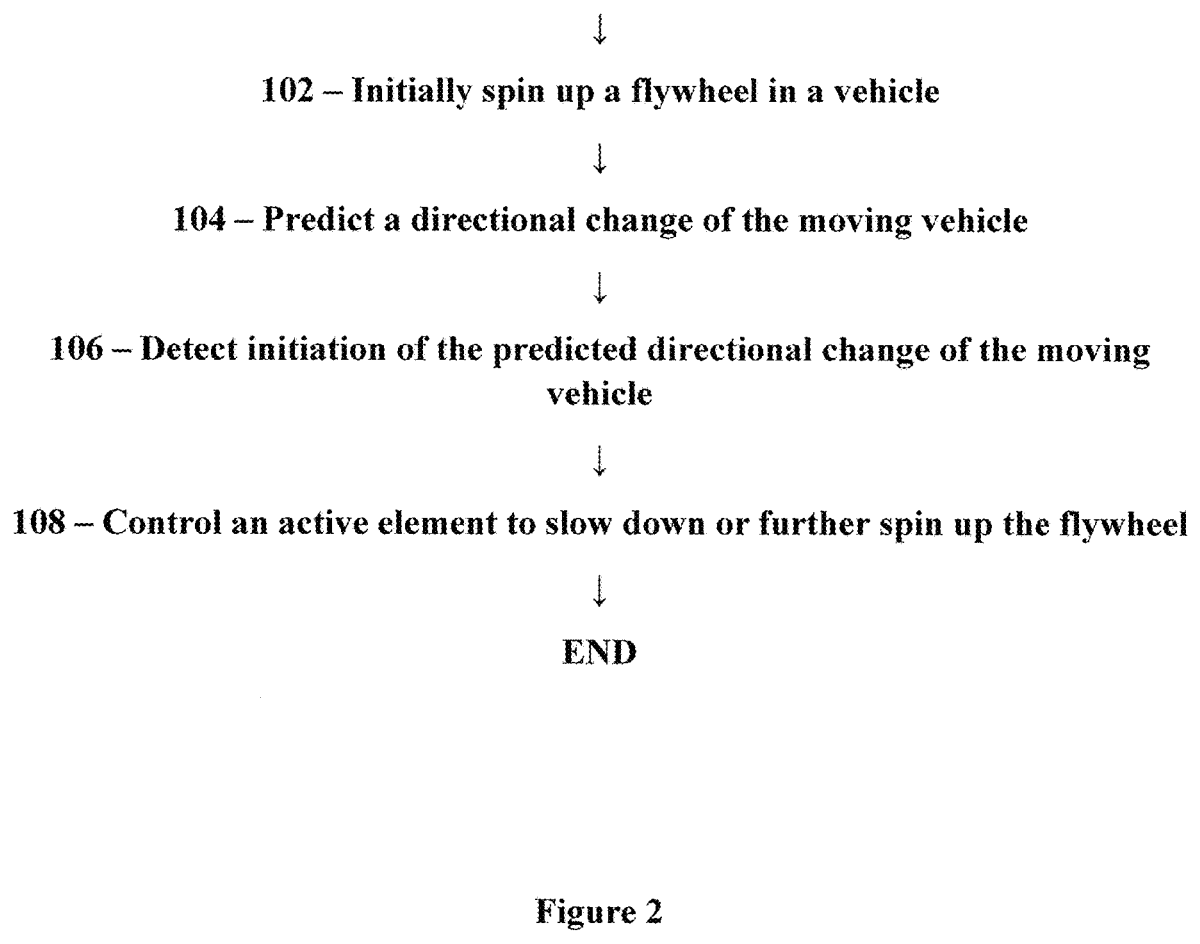

102 – Initially spin up a flywheel in a vehicle

↓

104 – Predict a directional change of the moving vehicle

↓

106 – Detect initiation of the predicted directional change of the moving vehicle

↓

108 – Control an active element to slow down or further spin up the flywheel

↓

END

Figure 3:
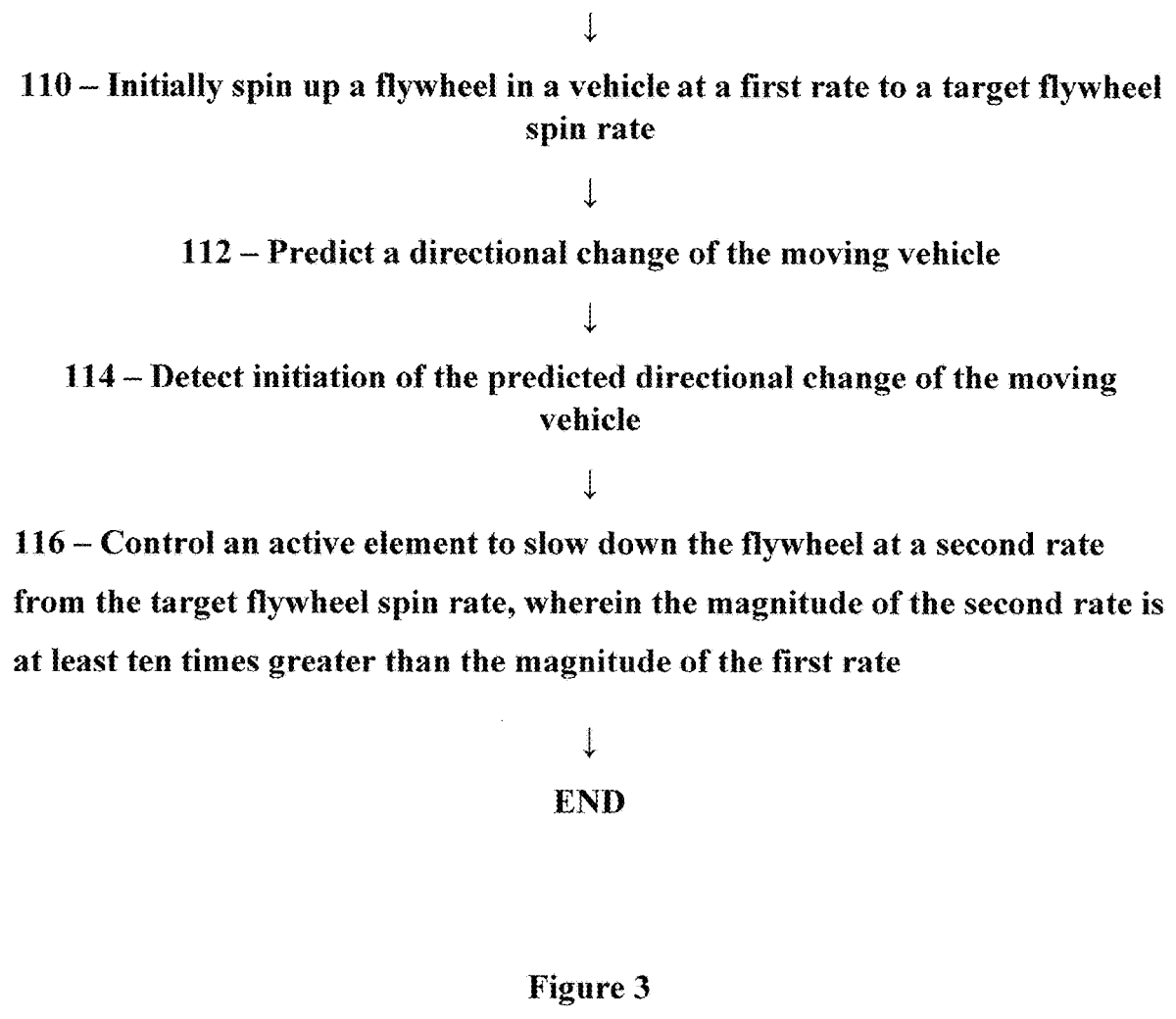

110 – Initially spin up a flywheel in a vehicle at a first rate to a target flywheel spin rate

↓

112 – Predict a directional change of the moving vehicle

↓

114 – Detect initiation of the predicted directional change of the moving vehicle

↓

116 – Control an active element to slow down the flywheel at a second rate from the target flywheel spin rate, wherein the magnitude of the second rate is at least ten times greater than the magnitude of the first rate

↓

END

Vehicle

206

Controller

204

Active
Element

202

Flywheel

208

Sensor(s)

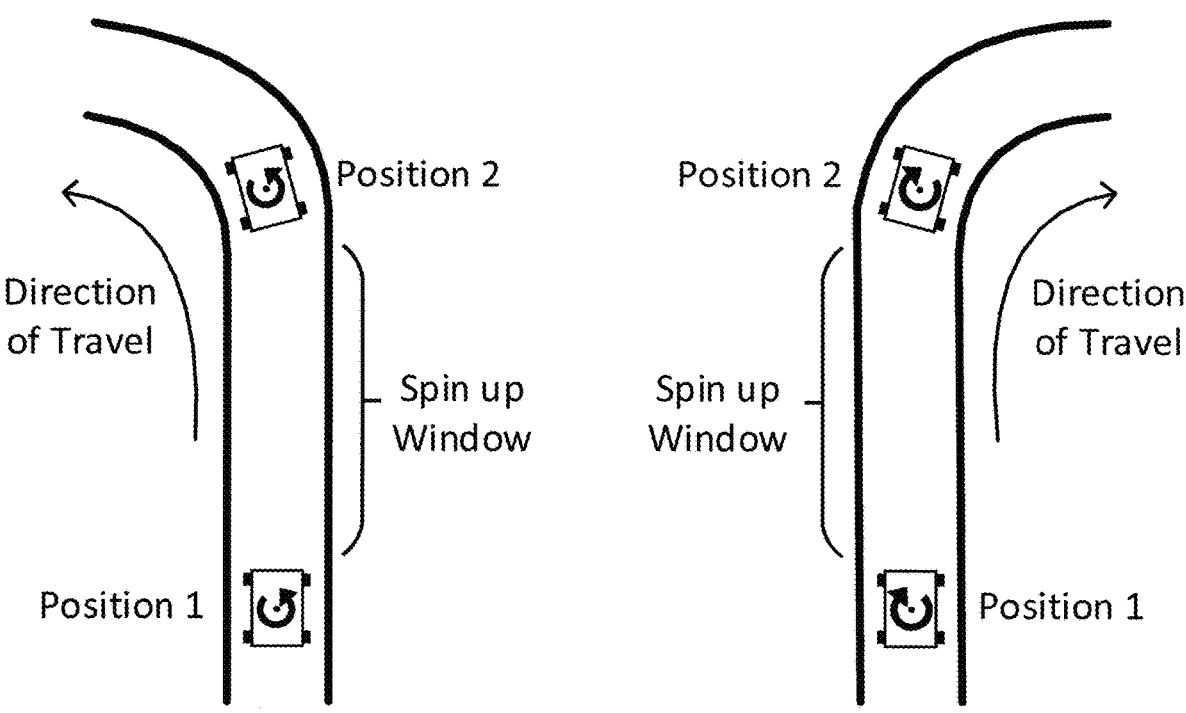
Figure 6A                              Figure 6B

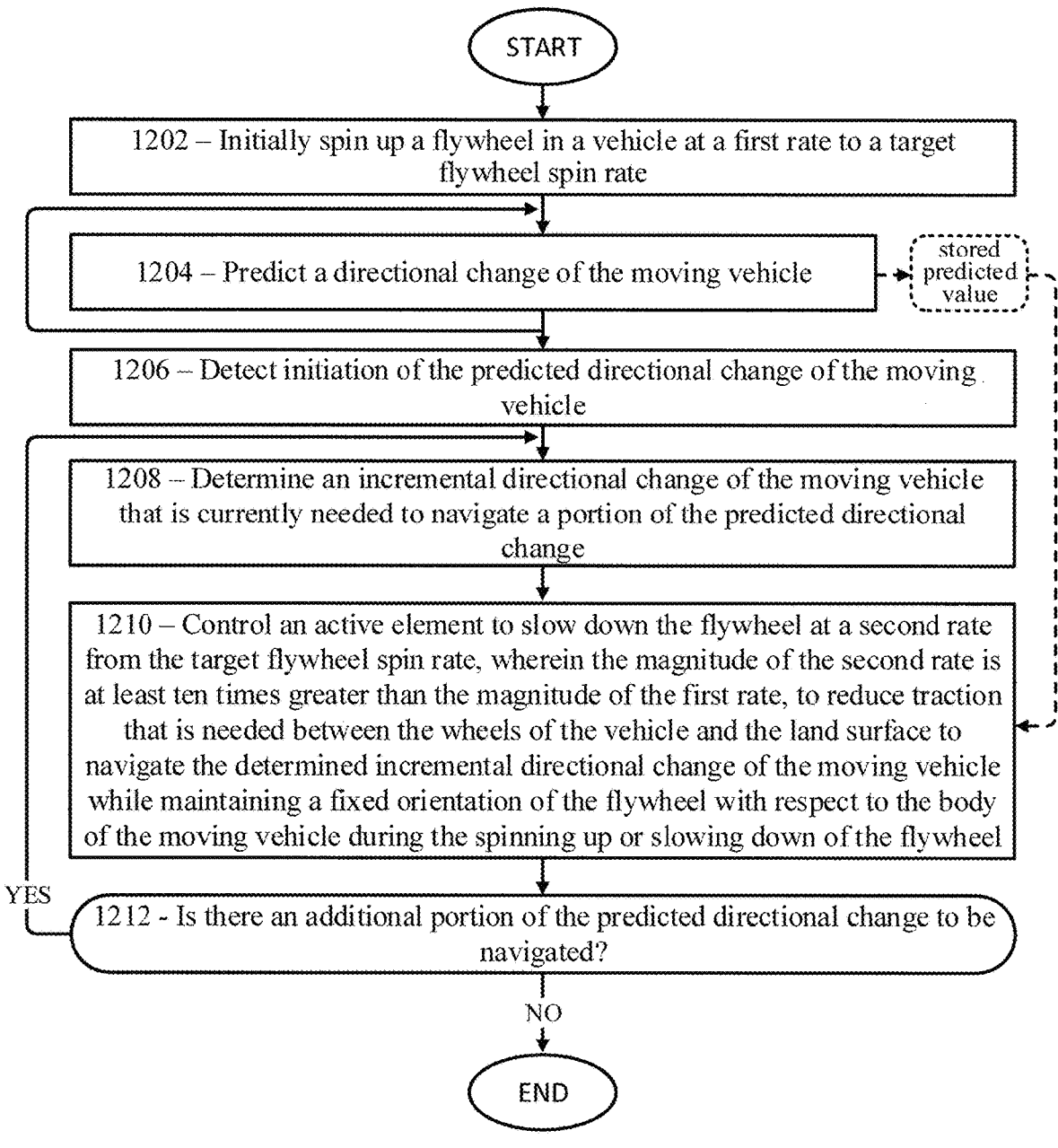

START

1202 – Initially spin up a flywheel in a vehicle at a first rate to a target flywheel spin rate 1204 – Predict a directional change of the moving vehicle stored predicted value 1206 – Detect initiation of the predicted directional change of the moving vehicle 1208 – Determine an incremental directional change of the moving vehicle that is currently needed to navigate a portion of the predicted directional change 1210 – Control an active element to slow down the flywheel at a second rate from the target flywheel spin rate, wherein the magnitude of the second rate is at least ten times greater than the magnitude of the first rate, to reduce traction that is needed between the wheels of the vehicle and the land surface to navigate the determined incremental directional change of the moving vehicle while maintaining a fixed orientation of the flywheel with respect to the body of the moving vehicle during the spinning up or slowing down of the flywheel

YES

1212 - Is there an additional portion of the predicted directional change to be navigated?

NO

END

Figure 12

METHODS FOR DYNAMICALLY IMPROVING DRIVING PERFORMANCE OF A MOVING MULTI-TRACK VEHICLE THAT IS TRAVERSING A LAND SURFACE

CROSS-REFERENCE TO RELATED APPLICATIONS

This application is a continuation-in-part of copending U.S. Non-Provisional patent application Ser. No. 18/595,841 filed Mar. 5, 2024, which is incorporated by reference herein.

BACKGROUND OF THE INVENTION

1. Overview Background

All vehicles such as cars and trucks navigating a turn on a roadway must accomplish multiple motions to successfully navigate the turn. FIG. 1 displays a roadway turn and the trajectory a vehicle will take to go around the turn. For illustration purposes only, the turn is defined with respect to a center of curvature. While traversing the turn, there are two primary kinds of motions a vehicle must undergo. First, there is a rotation of the body of the vehicle thereby changing its orientation. Second, there is a revolution about the center of curvature of the turn as the vehicle navigates through the turn, thus changing its direction of travel. FIG. 1 depicts the direction that the vehicle is traveling as changing from a first position to a second position and then a third position as the vehicle completes the turn. FIG. 1 also depicts the orientation of the vehicle rotating throughout the turn to keep the front of the vehicle pointed in the direction of travel. The vehicle graphic depicted at position 1 shows the initial position and orientation of the vehicle. The vehicle changes its direction of travel as it revolves from position 1 to position 2 around the turn to stay on the roadway, and also changes its orientation as it rotates to keep the front of the vehicle facing into the turn. This change in orientation is depicted by the solid graphic compared to the un-rotated dashed outline. The vehicle at position 3 is exiting the turn and shows a counterclockwise (when viewed from above) rotation of almost 90 degrees compared to the orientation of the vehicle from when it entered the turn at position 1.

The change in orientation of the body of vehicle is essentially a rotation about a vertical axis through the vehicle, frequently the center of gravity of the body of the vehicle, though the exact location depends on many factors including the relative traction levels of the vehicle's wheels. In mathematical terms this is a rotation about a Euler yaw angle. The ease at which a vehicle may rotate around any axis is inversely related to its moment of inertia about that axis. The moment of inertia is an integration (effectively a summation) of the bits of mass that make up the body of the vehicle times the distance of each bit of mass from the rotation axis squared. So, for example, rear- and front-engine vehicles have a much higher moment of inertia than mid-engine vehicles because they have a large amount of mass (the engine) positioned a relatively large distance from the yaw axis. Therefore, it takes more tire traction to reorient those vehicles into the direction that the vehicle is heading than mid-engine vehicles. High-performance race cars tend to have a mid-engine configuration as a result so that more of the limited tire traction available to the vehicle may be utilized to provide centripetal acceleration to navigate the directional change of the turn rather than torque to effectuate the needed rotation about the yaw axis.

2. Additional Background a. Steering Assistance

Nowadays vehicles have many systems that make them easier to operate on the road regardless of speed, but this was not always the case. When the first functional automobiles were hitting the main stage, there was no such thing as steering assistance. This made vehicles very difficult to drive at slow speeds because in order to turn, the driver would have to overcome the force of friction between the tires and the road. To fix this problem, and make vehicles easier to drive and more accessible to all types of people, power steering became necessary. Many historians believe the first design and patent for power steering came from a man named G. W. Fitts around 1876. That would make power steering older than the automobile, however, information surrounding Fitts and his patent is lost to time so it cannot be confirmed or denied. The next development in power steering came in 1900 when Robert E. Twyford patented a four-wheel drive system that featured a fully mechanical power steering system. Twyford's system failed to catch on but would be the start of many developments surrounding power steering. In 1926 Francis Davis, an engineer for Pierce-Arrow Motor Company, created the first practical hydraulic power steering system. Davis's system was mainly used on military vehicles that needed steering assistance due to the weight of the vehicles and the terrain that they were required to drive over. Around the same time, Davis also worked with General Motors (GM) to produce a power steering system for their road vehicles. His design for GM was deemed too expensive to produce for the mass market at the time but was a large stride in the right direction. By 1950, Davis's patent had expired and Chrysler Corporation began designing a power steering system based on his original designs. In 1951, the Chrysler Imperial sported a new power steering system coined the "Hydraguide." Following closely, GM began using Davis's designs to create their own power steering system which was released and was in every one of Cadillac's automobiles sold in 1952. By the 1960's over 3.5 million vehicles in the United States alone had power steering. Now almost all vehicles sold have power steering systems with a tiny exception for some extremely small and lightweight sports cars.

b. Hydraulic Power Steering

Hydraulic power steering systems were the most common type of power steering from the 1950s to the early 2000s. They work by using hydraulic fluid to apply additional force to the wheels when the steering wheel is turned. They require a pump that is attached to a belt connected to the engine. The pump creates pressure where the fluid is stored and then that pressure is utilized to apply force to the wheels, taking some of the load off the driver who is turning the steering wheel. This method of decreasing the required force from the driver also produces some drawbacks. Since the engine is required to run the belt which results in the pump working to create pressure in the fluid, some of the engine's power is always diverted from accelerating. Decreasing the available power from the engine affects the performance of the vehicle and can be a hindrance to the fuel economy of the vehicle. Hydraulic power steering systems also require hydraulic fluid to function. This requirement presents two main issues. The fluid needs to be replaced periodically, increasing the maintenance required for the vehicle, and the hydraulic lines that carry the fluid can spring leaks which would cause the power steering to stop working and introduce another point of failure to the vehicle. Early hydraulic power steering systems had issues with the amount of force they applied to the tires. When traveling at a low speed, a lot of force is helpful to turning, but at higher speeds, less assistance is needed. Early hydraulic power steering systems did not change the amount of assistance based on speed which made the steering wheel while driving at high speeds very unstable.

c. Electric Power Steering

Most vehicles today use electric power steering systems. They work through an electric motor that applies additional force to the tires when the driver turns the steering wheel. They eliminate the need for hydraulic fluid but they still contain a mechanical link between the steering wheel and steering assembly. The benefits of an electric power steering system include better fuel efficiency as the vehicle's motor is no longer the direct source of power for the power steering system, a simpler system that is easier to make and maintain, and situation-based adjustments on the amount of force applied to the tires making driving easier at both high and low speeds.

d. Electro-Hydraulic Power Steering

Electro-Hydraulic power steering systems are very rare. They are a hybrid of hydraulic and electric systems. They use hydraulic fluid to apply force to the wheels, but instead of the pump being powered by the engine, it is powered by an individual electric motor. This system produces better fuel efficiency but does not typically adjust based on speed like a fully electric system.

e. History of Reaction Wheels in Spacecraft

A reaction wheel functions due to the concepts of conservation of angular momentum and torque. In ancient times observations were made about spinning objects. People noticed that a spinning object would cause an opposite force when its rotations change. These observations developed into the premise for reaction wheels. While the concepts surrounding reaction wheels are very old, it was not until the 1950's that practical ones were developed. From the 1950's to the 1960's, reaction wheels were used in attitude control systems for spacecraft. The Vanguard and Explorer programs were some of the first times reaction wheels were used in spacecraft. They were used to aid stabilization and pointing. By having three reaction wheels with different orientations, the pitch, roll, and yaw axis could all be controlled more precisely than using the thrusters, and the payload of fuel required to navigate in the spacecraft was decreased. Reaction wheels continued to improve into the 1970's and 1980's when digital control systems were developed. The digital control systems allowed the reaction wheels to be more precise which allowed for more accurate pointing and imaging stability. Newer complex maneuvers could now be achieved using reaction wheels, and the Hubble Space Telescope adopted reaction wheels to aid in its uses. The next major development came in the 1990's to the 2000's when advancements in microelectronic technologies came along. These advancements allowed reaction wheels to be smaller and lighter weight, opening the potential to use them in smaller spacecraft such as CubeSats. Redundancy became a common practice with reaction wheels because a failure of just one of the three necessary wheels could shorten or abruptly end a mission. It became common for four or more reaction wheels to be used on every spacecraft which utilizes the technology, three for function and at least one spare. The most recent improvement to reaction wheels came in the 2010's when the torque density was improved. Higher torque density allowed for more precise control of the attitude of the spacecraft. After this development, reaction wheels began to be used as an alternate for other control systems such as thrusters and magnetorquers, which allowed for more comprehensive and adaptable attitude control.

f. Reaction Wheel Types

The most common type of reaction wheel, sometimes called a flywheel, is a momentum wheel. Momentum wheels work by rapidly spinning a rotor using a motor assembly. When used in spacecraft, by accelerating or decelerating, the rotor torque is generated on the spacecraft, but they are usually used to build up resistance to changes in attitude in spacecraft. The benefits of momentum wheels are their compact, lightweight design, and their precise control over a wide range of spacecraft sizes. A reaction wheel can only be called a momentum wheel if it is constantly spinning and never at rest.

Control moment gyroscopes (CMGs) are slightly less common than momentum wheels but are still quite common. They are a more advanced version of a momentum wheel and provide both torque and angular momentum control. They consist of a rapidly spinning rotor contained within a gimbal assembly. The gimbal assembly allows the axis that the rotor is spinning on to be reoriented, giving precise three-axis control.

Double gimbal reaction wheels (DGRWs) are similar to control moment gyroscopes but feature two gimbal assemblies which allow for more control over the rotor's orientation. They increase the flexibility of the system and have better control of the attitude of the spacecraft.

The least common version of reaction wheels is the cold gas reaction wheel. This type of reaction wheel uses compressed gas like nitrogen or helium as the reaction mass in place of the rotor that is used in other versions of reaction wheels. The compressed gas is released in specific directions which generates the torque, and thus the attitude control for the spacecraft. This type of reaction wheel is beneficial as it reduces the mechanical complexity of the system, which promotes a lower chance of mechanical failure but consumes a limited resource in operation. Cold gas reaction wheels lower the spacecraft's sensitivity to vibration and reduce bearing friction as they do not require a spinning rotor.

g. History of Flywheels in Automobiles

Flywheels have been utilized throughout history in some of civilizations' earliest inventions. Early instances of harnessing the unique abilities of the flywheel include the water wheel, pottery wheel, and virtually any system that requires stable and equalized rotational velocity. During the Industrial Revolution, flywheels were used in almost all factory machines and even steam engines. Flywheels in automobiles are a relatively new innovation. One of the first accounts of using flywheels in a vehicle (besides those attached to the crankshaft of an internal combustion engine) was in the 1950's when Oerlikon®, a Swiss technology company, came out with the Gyrobus. The Gyrobus was a bus that ran on electricity generated by a flywheel. At bus stops, the flywheel would be spun up by charging points at appropriate locations for its travel distance. Once fully charged, the flywheel would work as a generator enabling the bus to travel an average of 3.7 miles at around 35 miles per hour. The Gyrobus was eventually retired due to a multitude of technical challenges. In the 1960's, research was done with the hope of finding a way to use energy-storage flywheels in commercial and passenger vehicles with designs for a new transmission released, however, no practical designs were released. In the 1970's, research into a fuel-efficient flywheel vehicle picked up again with the oil crisis and the U.S.

government funded many projects to test the merit of flywheel-based designs. However, the increased interest declined again going into the 1980's after the oil crisis ended. Interest peaked again in the 1990's when stricter emissions laws were released worldwide which resulted in the development of electromechanical batteries developed by the Lawrence Livermore Laboratory and the University of Eindhoven. The next large development with flywheels in automobiles occurred in 2006 when the International Automobile Federation (FIA) declared the intention to recover and reuse the kinetic energy from Formula 1 race cars by implementing kinetic energy recovery systems (KERS). However, KERS were not implemented into the race cars until 2009. Some of these systems were flywheel-based, but circumstances surrounding packaging issues, the racing rules, and the costs of the systems resulted in most teams using battery-based systems. Today most vehicles have some implementation of flywheels in their design. They are rarely for energy preservation but rather for smoother driving, and an easier starting process when turning over a vehicle's engine.

3. What is Needed

Vehicles which are navigating a turn often must accomplish the turn when available tire traction is less than ideal. This could be because the vehicle is in a race on a race course or because of weather conditions like snow and ice. The turn may be expected or it may be a result of an emergency, such as debris or a child on a roadway, resulting in skidding or "snow plowing" of the turned tires and potential crash with loss of life or property, or ego when a race is lost.

The tires on any vehicle are able to provide a limited amount of traction depending on parameters such as their composition, wear, roadway conditions, and the vehicle's suspension design. The available traction is often referred to as a "traction circle" which describes the limited tire traction that can be utilized for braking, accelerating, turning, or a vector combination thereof. Exceeding the traction circle causes skidding.

Methods are needed to dynamically improve driving performance of a moving vehicle that is traversing a land surface in a manner that reduces the tire traction that the moving vehicle needs to reorient the moving vehicle as it traverses a turn, thereby increasing the tire traction available to the moving vehicle to be used for braking, accelerating, or navigating the turn.

The present invention provides preferred embodiments which help to meet these needs.

SUMMARY OF THE PRESENT INVENTION

Methods and apparatus are provided for dynamically improving driving performance of a moving vehicle that is traversing a land surface. The apparatus includes a flywheel, an active element, and a controller. The flywheel is oriented in a direction with respect to a body of the vehicle such that spinning up or slowing down of the flywheel applies a yaw torque on the body of the moving vehicle. The active element controls the flywheel and is configured to apply torque to spin up or slow down the flywheel. The controller is configured to predict the directional change of the moving vehicle, detect initiation of the predicted directional change of the moving vehicle, and control the active element to spin up or slow down the flywheel after detecting initiation of the predicted directional change of the moving vehicle. The flywheel thereby applies a yaw torque on the body of the moving vehicle during the predicted directional change of the moving vehicle, and thereby dynamically improves driving performance of the moving vehicle that is traversing a land surface.

BRIEF DESCRIPTION OF THE DRAWINGS

Preferred embodiments of the present invention will now be described by way of example with reference to the accompanying drawings:

FIGS. 2 and 3 are flowcharts of preferred embodiments of the present invention.

FIGS. 6A and 6B are schematic diagrams of turns of a roadway and illustrate flywheel rotational movement in the vehicle as the vehicle traverses the roadway.

FIGS. 10, 12, and 13 are flowcharts of other preferred embodiments of the present invention.

DETAILED DESCRIPTION OF THE INVENTION

Figure 1:
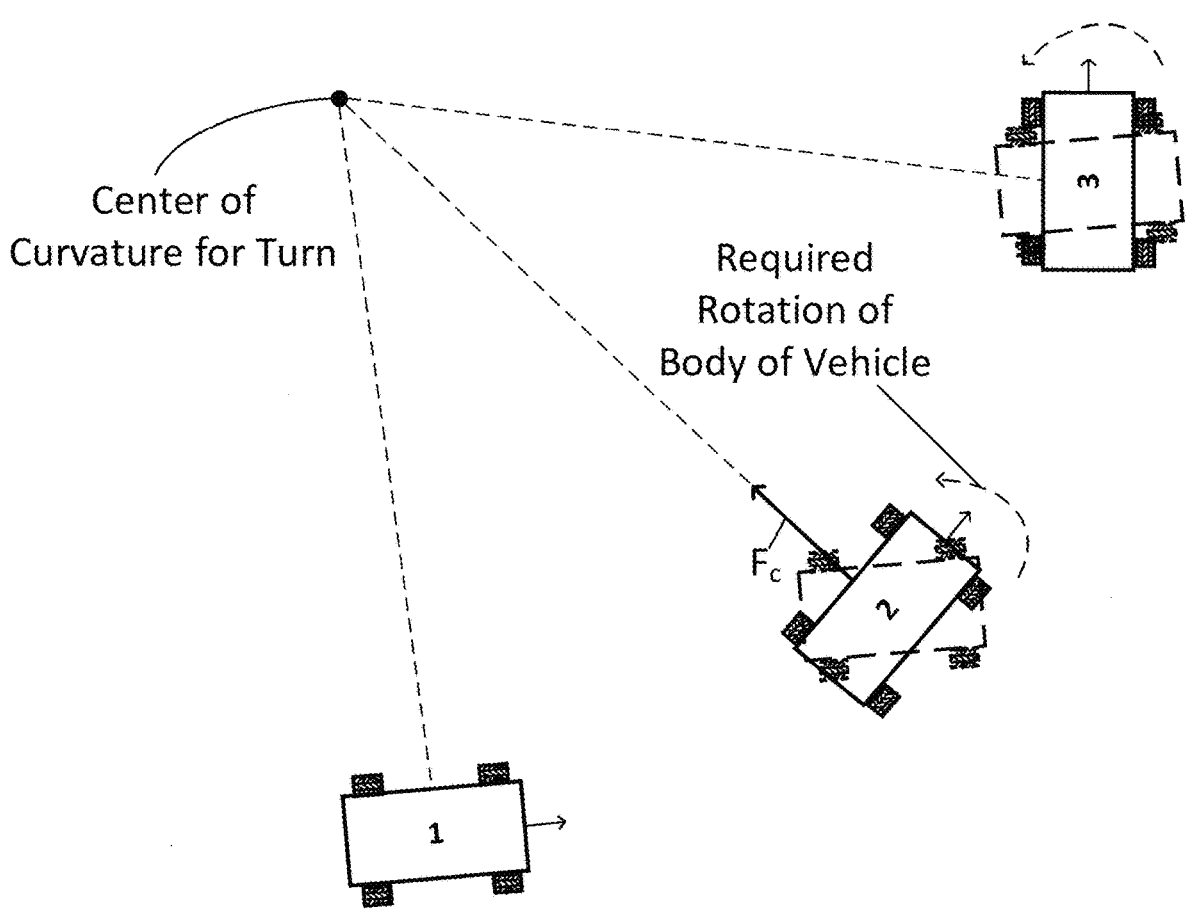
FIG. 1 is a schematic diagram of a turn of a roadway and the trajectory a vehicle will take to go around the turn.

Certain terminology is used herein for convenience only and is not to be taken as a limitation on the present invention.

The words "a" and "an", as used in the claims and in the corresponding portions of the specification, mean "at least one."

I. DETAILED DESCRIPTION OF PREFERRED EMBODIMENT

A. Overview

In one preferred embodiment of the present invention, driving performance of a moving vehicle that is traversing a land surface is dynamically improved. The land surface may be a paved roadway, a racetrack, or on unpaved or natural surfaces. The surfaces may be dry, wet, underwater, or have other aspects which alter traction such as snow, ice, mud, sand, dirt, rocks, gravel, or other natural terrain. The surface conditions may also vary due to bump, potholes, cracks, and debris which may decrease the available traction and thus limit driving performance.

The vehicle includes at least the following components which are typically not part of a conventional production vehicle:

(i) A flywheel oriented in a direction with respect to a body of the vehicle such that rapid spinning up or rapid slowing down of the flywheel applies a yaw torque on a body of the moving vehicle. In this preferred embodiment, the flywheel is initially spinning. Accordingly, spinning up the flywheel requires a further spinning up of the flywheel which is done at a rapid rate.

In one preferred embodiment, the initially spinning flywheel is initially spun up at a non-rapid rate to reach a "target flywheel spin rate" and any subsequent (further) rapid spinning up or slowing down of the flywheel is done from the target flywheel spin rate. If the initially spinning flywheel is not currently at its target flywheel spin rate, such as after the flywheel has been rapidly spun or rapidly slowed down, the flywheel is preferably returned to its target flywheel spin rate at the non-rapid rate in preparation for a subsequent rapid spinning up or rapid slowing down. A discussion of the meaning of a "rapid rate" and a "non-rapid rate" (also, interchangeably referred to herein as a "slow rate") follows below. The target flywheel spin rate has a certain acceptable tolerance (+/−) about a single spin rate.

The preferred embodiments described herein refer to "a body of a (moving) vehicle." As background, the body of the vehicle is conventionally divided into two main parts, namely, the load-bearing structure and the bodywork. The load-bearing structure is the frame or chassis that provides rigidity and that supports the weight of the vehicle and its load (e.g., passengers, cargo). The bodywork is the outer shell that covers the load-bearing structure. However, in preferred embodiments of the present invention, the "body of a vehicle" includes the entire sprung mass of the vehicle.

(ii) An active element that controls the flywheel. The active element is configured to apply torque to spin up or slow down the flywheel. The active element may be a single component or it may be multiple, independently controllable components. If the active element includes only a single component, it should generally be a component that is able to both spin up and slow down the flywheel at a rapid or non-rapid (slow) rate. Examples of such components include a radial motor, an axial motor, a stepper motor, a solenoid, or the vehicle's propulsion engine when used in conjunction with appropriate added flywheel transmission components.

In an example where the active element includes multiple, independently controllable components, the flywheel is initially spun up using one of the multiple, independently controllable components and the flywheel is rapidly slowed down using another one of the multiple, independently controllable components. Examples of components that can rapidly slow down a flywheel include a radial motor, an axial motor, a stepper motor, a solenoid, the vehicle's propulsion engine when used in conjunction with appropriate added flywheel transmission components, a disk brake, a drum brake, a circumferential brake, a magnetic brake, and an engine brake. Thus, one exemplary embodiment may use any suitable motor to spin up the flywheel and any suitable type of brake to rapidly slow down the flywheel. If appropriately oriented, a combination assembly may serve two or all three of the preceding functions (i) as the flywheel (e.g., an axial motor armature with its spin axis mounted vertically or predominately vertical), (ii) as the active element (e.g., as a motor using electromagnets of the motor to spin up the armature), and/or (iii) as a brake (e.g., as a motor in a regenerative mode). A preferred embodiment uses an axial motor-generator with its spin axis mounted vertically or predominately vertical. Another example is the disc brake rotors which are normally mounted close to the rotating wheels but with an appropriate gear assembly mounted so that the rotating discs are oriented horizontally (i.e., spin axis is vertical or predominately vertical). The gearing and connection assembly linked to each wheel could ensure that the rotating discs spin at desired rates and in desired spin directions, which may be the same or different.

In some embodiments, the rotation axis of the flywheel may be restricted in one or more dimensions. For example, if all that is desired is yaw torque at particular times, the pitch and roll axes may be permanently fixed or restricted in movement by brakes, fixed stops, or elements under control of the controller.

(iii) A controller. The controller is configured to perform at least the following functions:

(a) Predict the directional change of the moving vehicle.

(b) Detect initiation of the predicted directional change of the moving vehicle.

(c) Control the active element to initially spin up, slow down, or further spin up the flywheel after detecting initiation of the predicted directional change of the moving vehicle, thereby applying a yaw torque on the body of the moving vehicle during the predicted directional change of the moving vehicle, and thereby dynamically improving driving performance of the moving vehicle that is traversing a land surface.

FIG. 2 is a flowchart of the preferred embodiment described above, and includes the following steps, illustrated in summary format: Step 102: Initially spin up a flywheel in a vehicle Step 104: Predict a directional change of the moving vehicle Step 106: Detect initiation of the predicted directional change of the moving vehicle Step 108: Control an active element to slow down or further spin up the flywheel FIG. 3 is a flowchart of another the preferred embodiment described above, and includes the following steps, illustrated in summary format:

Step 110: Initially spin up a flywheel in a vehicle at a first rate to a target flywheel spin rate Step 112: Predict a directional change of the moving vehicle Step 114: Detect initiation of the predicted directional change of the moving vehicle Step 116: Control an active element to slow down the flywheel at a second rate from the target flywheel spin rate after detecting initiation of the predicted directional change of the moving vehicle, wherein the magnitude of the second rate is at least ten times greater than the magnitude of the first rate. In other embodiments, the magnitude of the second rate may be less than, equal to, or greater than the magnitude of the first rate, and the magnitude difference will depend upon factors such as performance needs, ride comfort needs, predictions regarding upcoming turns, capabilities of the active elements, flywheels, and sensors, past vehicle activity, and road or environmental conditions.

Using the apparatuses and processes described above reduces the tire traction that the moving vehicle needs to reorient the moving vehicle as it traverses a turn, thereby increasing the tire traction available to the moving vehicle to be used for braking, accelerating, or navigating the turn.

Figure 4:
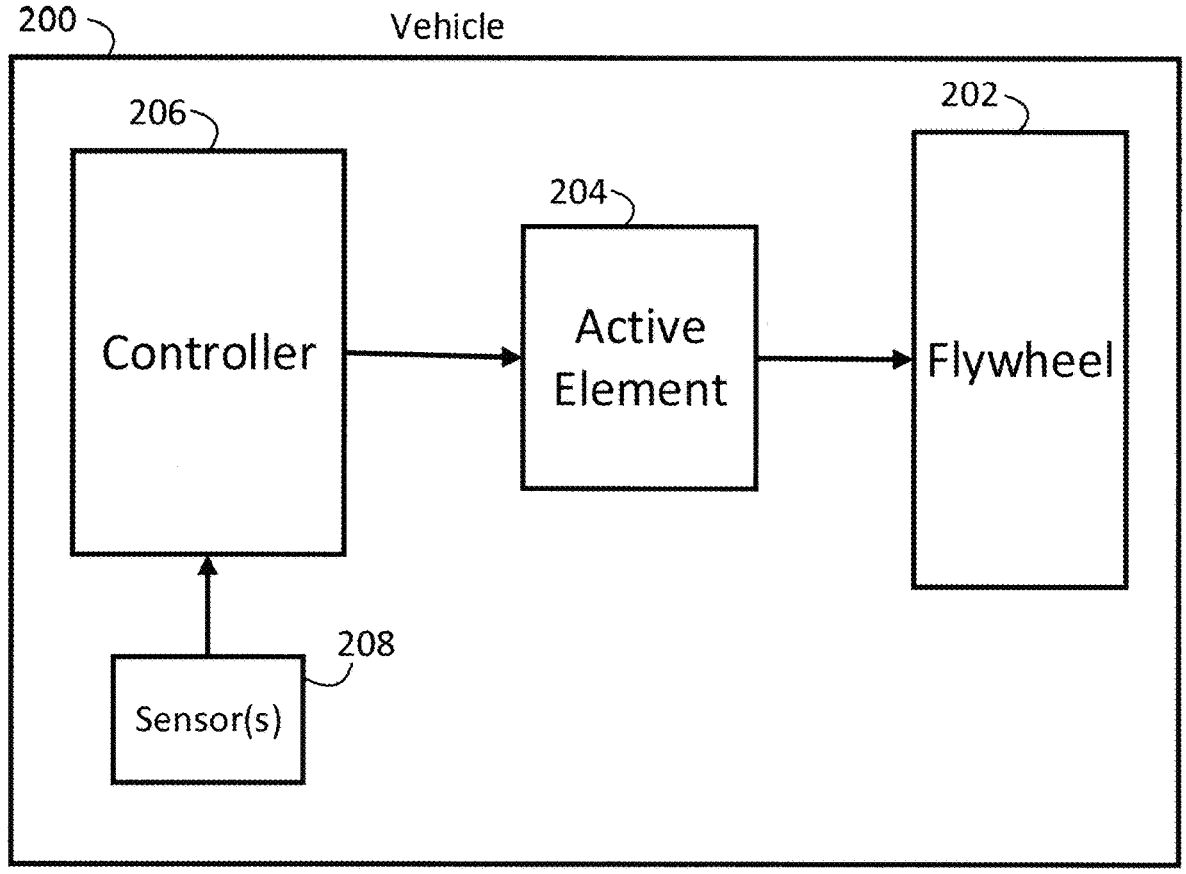
FIG. 4 is a schematic diagram of apparatus elements in a vehicle in accordance with a preferred embodiment of the present invention.

FIG. 4 is a schematic diagram of vehicle 200 that shows components of the vehicle 200 for dynamically improving driving performance. As discussed above, the active components include flywheel 202, active element 204, and controller 206. As further discussed below, one or more sensors 208 provide input(s) to the controller 206 that are used by the controller 206 to detect initiation of the predicted directional change of the moving vehicle.

In one alternative embodiment, the controller 206 is further configured to monitor tire traction of the moving vehicle's tire. In this alternative embodiment, the controller 206 controls the active element 204 to slow down, or further spin up the flywheel 202 only when the controller 206 determines that the tires of the moving vehicle 200 have insufficient traction to successfully complete the predicted directional change of the moving vehicle 200. The torque applied using the flywheel 202 may still be insufficient to allow the successful completion of the directional change, but it can still allow for more control to be exerted to maintain safety and stability and to avoid obstacles.

In another alternative embodiment, the controller 206 is further configured to detect an understeer or oversteer condition, and the controller 206 controls the active element 204 to slow down, or further spin up the flywheel only when the controller detects an understeer or oversteer condition.

In another alternative embodiment, the controller 206 is further configured to detect a slide (drift) condition, and the controller 206 controls the active element 204 to slow down, or further spin up the flywheel 202 only when the controller 206 detects a slide (drift) condition. The controller 206 may also apply the brakes, adjust aerodynamic elements on the vehicle 200, increase or decrease the engine power/throttle, shift gears or alter the transmission's ratio, or steer the car in conjunction with the flywheel action to assist the driver in maintaining control in varied conditions.

In general, for the above embodiments, if a course of travel has more turns in one direction than another, the flywheel can be prepared for that situation by being spun up (or slowed down) such that the flywheel is spinning at a rate and in a direction which can help traversing the turns in that situation the most. The same kind of preparation can be used if there is a single particularly difficult turn, or set of difficult turns, in one direction. Performance in other turns, or in other directions can still be assisted, but the main focus would be on the major turn(s). If, for example, braking the flywheel can apply more beneficial torque at the correct time than further spinning up the flywheel, the flywheel can be preferentially spun up so that it can be rapidly slowed down with the brake during the major turn to apply the most torque during that turn.

The flywheel 202 may be a single flywheel or may be a flywheel assembly that includes a plurality of flywheels, discussed below in Section L. In cases where multiple flywheels are present, the individual flywheels may be independently operated and controlled. For example, they may be used in a counter-rotating manner, spun up in the same direction, braked or slowed together or independently, or other combinations depending on the physical configuration of the elements, controller's logic, and the vehicle's performance needs. As a further embodiment, the multiple flywheels may be located in several different parts of the body of the vehicle, where space or weight balancing allows, or where their effect would be of the greatest benefit. For example, one flywheel or set of flywheels may be located over the front axle, and another flywheel or set of flywheels may be located over the rear axle.

B. Orientation of the Flywheel with Respect to the Body of the Vehicle

In one preferred embodiment, the flywheel is oriented such that its diameter (and radius) is parallel to the plane of the body of the vehicle, its edge thereby being perpendicular to the plane of the body of the vehicle, as geometrically depicted in FIG. 5A which is described in more detail below. This orientation is formally described that the flywheel rotation axis is parallel to the yaw axis of the body of the vehicle, although other orientations of the flywheel may be considered when implemented such that the flywheel axis and the body yaw axis are offset, such as by 10 or 20 degrees. The orientation of the flywheel to a body of the vehicle needs to be arranged such that spinning up or slowing down of the flywheel applies a yaw torque on the body of the moving vehicle. The component of the torque vector projected on the yaw axis of the vehicle is proportionate to the cosine of the offset angle. FIG. 5B is a schematic diagram of only the flywheel of FIG. 5A and its bearing and shaft components that are not depicted in FIG. 5A.

Figure 5A:
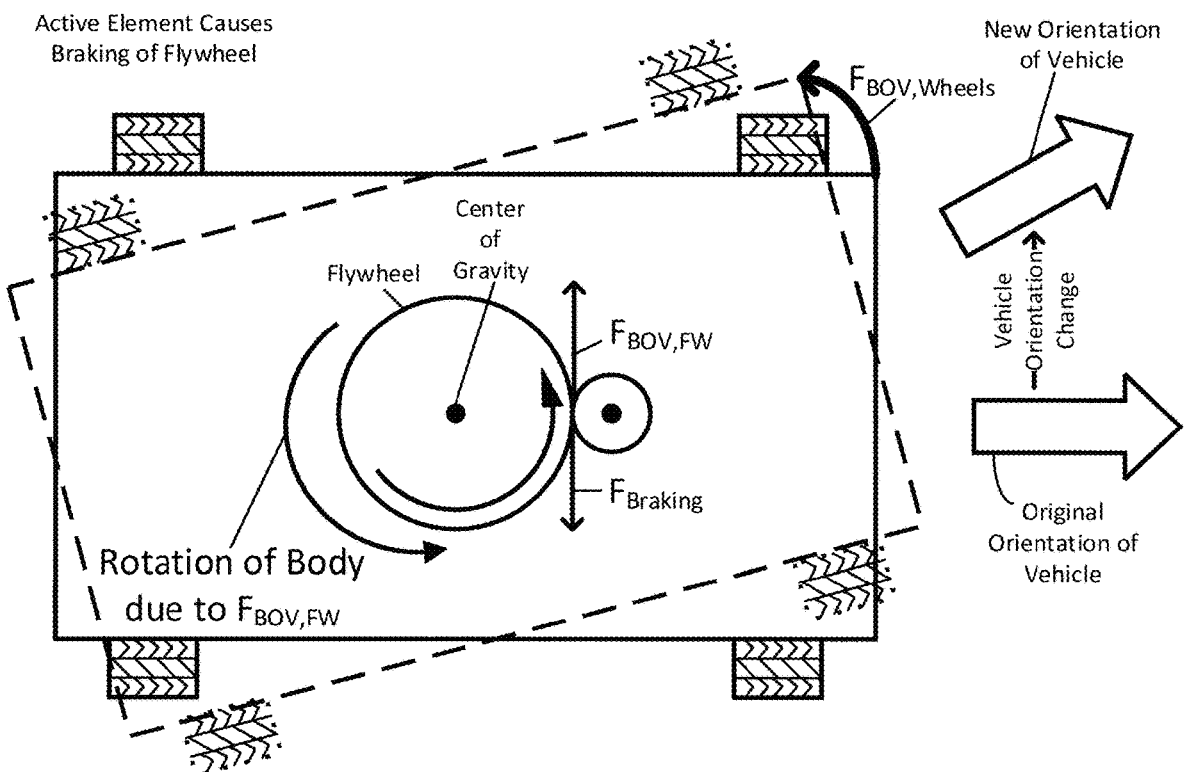
FIGS. 5A-5C are schematic diagrams of a vehicle having a flywheel mounted therein in accordance with a preferred embodiment of the present invention.
Figure 5B:
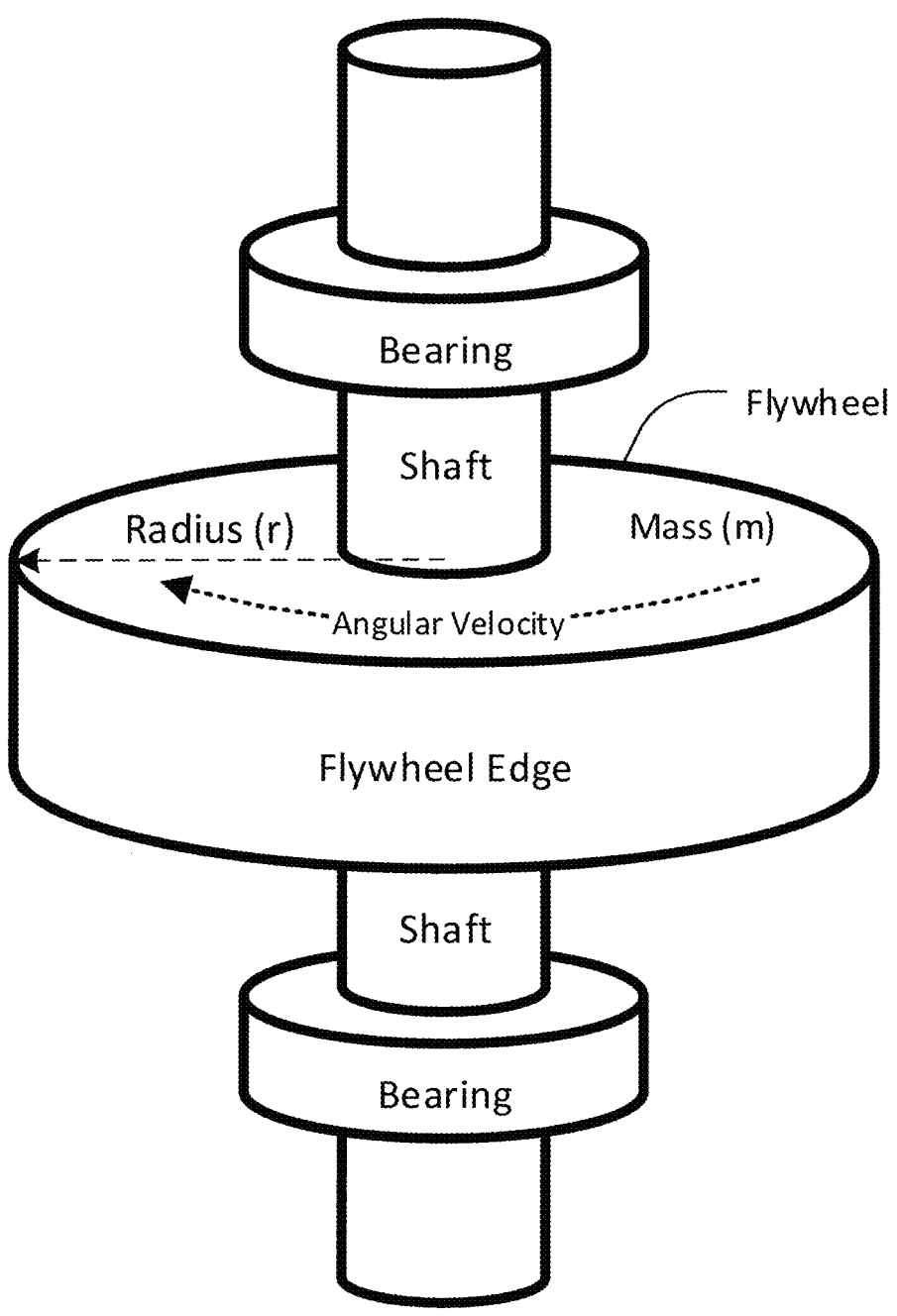

In addition, the flywheel may be located coaxial with the center of gravity of the vehicle, as also geometrically depicted in FIG. 5A. Alternatively, the flywheel may be not be coaxial with the center of gravity of the vehicle. For example, the flywheel may be mounted towards the front of the vehicle, as geometrically depicted in FIG. 5C.

Referring again to FIGS. 5A and 5C, these figures depict the actions occurring in the flywheel of a moving vehicle. In this embodiment, the flywheel is rapidly slowed down upon detection of the initiation of a predicted directional change in the moving vehicle. The solid rectangle represents the vehicle's original orientation and contains the flywheel (the larger circle), a brake (the smaller circle), and the center of gravity of the vehicle (the leftmost dot). The dashed rectangle represents the new (final) orientation of the vehicle after the directional change. The labeled force vectors are described below.

D. Flywheel Composition and Dimensions

Figure 5C:
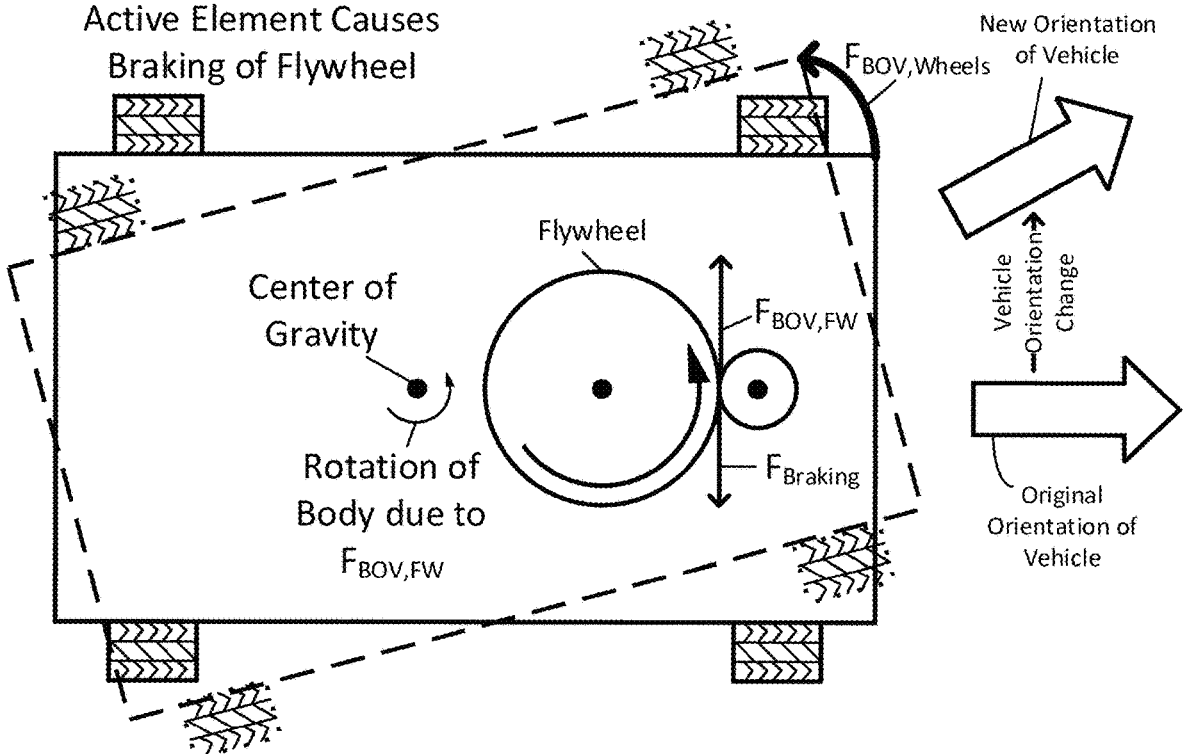

The dimensions of the flywheel illustrated in FIGS. 5A-5C are for illustration purposes only and the preferred dimensions will be optimized based on multiple factors, including space and weight constraints. The flywheel composition will be optimized based on multiple factors such as cost constraints, safety concerns (flywheel should be engineered to not break apart or become distorted under repeated instances of maximum load), maximum desired energy density, and desired efficiency (the efficiency of a flywheel is determined by the maximum amount of energy it can store per unit weight). High-strength steel or composites are examples of suitable materials for the flywheel depicted herein.

E. Rapid Rate/Non-Rapid (Slow) Rate

As discussed above, spinning up or slowing down of the flywheel applies yaw torque on a body of the moving vehicle. Any spinning up or slowing of the flywheel will apply some magnitude of yaw torque on the body of the moving vehicle. If the flywheel is slowly spun up or slowly slowed down, the magnitude of the yaw torque (and other resulting torques) on the body of the vehicle will be small and unnoticeable or not disruptive to the vehicle occupants or vehicle performance. In one preferred embodiment, the flywheel is initially spinning, and preferably at a target flywheel spin rate. It is generally desirable to reach the target flywheel spin rate in a manner that is unnoticeable or not disruptive to the vehicle occupants or vehicle performance.

Predicted and unpredicted directional changes can be utilized to change the initial rate of the flywheel faster than the slow rate described above when the directional change is in a direction which is benefitted by the increasing or decreasing of the flywheel speed. This can allow reaching the target speed more quickly without reducing, and even possibly improving, the driving performance.

When it is desired to slow down or further speed up the flywheel after detecting initiation of the predicted directional change of the moving vehicle so as to apply a yaw torque on the body of the moving vehicle during the predicted directional change of the moving vehicle (i.e., when the moving vehicle is actually making the directional change that was previously predicted), the flywheel needs to be rapidly spun up or rapidly slowed down. The rapid spinning up or rapid slowing down of the flywheel applies a yaw torque on the body of the moving vehicle that is sufficient in magnitude so as to dynamically improve driving performance of the moving vehicle as it makes the directional change.

When the flywheel is spun up to its initially spinning rate, which in one preferred embodiment, is the target flywheel spin rate, the flywheel is spun up at a first rate. When the flywheel is slowed down from its initially spinning rate, or further spun up from its initially spinning rate, it is slowed down or further spun up at a second rate. In one preferred embodiment, the magnitude of the second rate is at least ten times greater than the magnitude of the first rate. This at least 10× magnitude difference quantifies one preferred embodiment of the concept described above of slow vs. rapid spinning up, slow vs. rapid slowing down, or slow vs. rapid further spinning up the flywheel, depending up the current actions that need to be taken (e.g., initially spin up the flywheel to a target flywheel spin rate, or make a rapid change to the flywheel after detecting initiation of the predicted directional change of the moving vehicle, or return the flywheel to a target flywheel spin rate after making a rapid change to the flywheel after detecting initiation of the predicted directional change of the moving vehicle). Sample flywheel spin rates are discussed below but the scope of the present invention is not limited to these sample flywheel spin rates. As discussed above, in other embodiments, the magnitude of the second rate may be less than, equal to, or greater than the magnitude of the first rate.

F. Predicted Directional Change/Initiation of the Predicted Directional Change

There are multiple, different scenarios where the controller predicts that the moving vehicle will make a directional change. A non-exhaustive list of such scenarios are as follows:

1. The vehicle is on a straight section of a paved roadway, a racetrack, or on unpaved surface and there is an upcoming directional change, such as a curved section or sharp turn that the vehicle must pass through if it is to remain on the paved roadway, racetrack, or unpaved surface, or if it is to remain on a previously programmed, or anticipated (such as based on popularity or previous trips) navigation route. If the vehicle is on a straight section of a racetrack, the curved section may be the next turn of the racetrack. Real-time tracking of the vehicle using GPS, cameras, road sensors, or other technologies may be used to track the vehicle movement in space.

2. The vehicle is on a curved section of a paved roadway, racetrack, or unpaved surface and there is an upcoming directional change, such as a curved section in the opposite direction or an additional curved section in the same direction, or a sharp turn in either direction that the vehicle must pass through if it is to remain on the paved roadway, racetrack, or unpaved surface, or if it is to remain on a previously programmed, or anticipated (such as based on popularity or previous trips) navigation route. If the vehicle is on a curved section of a racetrack, such as within a chicane, the curved section may be the next turn of the racetrack. Again, real-time tracking of the vehicle using GPS or the like may be used to track the vehicle movement in space.

3. The driver of the vehicle has turned the steering wheel indicating that the driver wants the vehicle to turn. A steering angle sensor (SAS) may be used to detect this action. Merely turning the steering wheel does not necessarily result in the vehicle immediately turning. There may be delays due to electronic components that are responsible for controlling mechanical linkages. Alternatively, physical traction limits may be exceeded resulting in skidding of front wheels of the vehicle (snowplowing) which means that the vehicle will not turn as desired.

4. A vehicle safety feature has detected an emergency condition that requires the vehicle to make an immediate directional change to the vehicle so as to maintain control of the vehicle or to avoid a crash.

5. The vehicle is experiencing an unintended directional change. There may be no, or little, additional steering input, but the vehicle has started to change direction or slide out. This can be caused by factors such as wind, or roadway conditions such as ice reducing traction.

The predicted directional change may thus include both desired directional changes (e.g., scenarios 1, 2, and 3) and reactionary directional changes (e.g., scenarios 4, and 5). In scenario 5, the flywheel could be used to maintain or restore the intended, possibly straight ahead, direction of travel.

In one preferred embodiment, the predicted directional change of the moving vehicle is a predicted change in orientation of a body of the moving vehicle. An example of an orientation change of direction is when the vehicle is traversing a partially icy but straight section of roadway and then starts to spin while still staying on the roadway.

Initiation of the predicted directional change occurs upon sensing that the vehicle is actually making the predicted directional change. The controller receives input from one or more sensors that perform this function. A non-exhaustive list of such sensors are as follows:

1. A g-force accelerometer which produces a signal that is interpreted by the controller as indicating the lateral acceleration of the moving vehicle's tires.

2. Front wheel angle sensor which indicates the angle of the front wheels. Assuming that the vehicle has full traction and no wheels are slipping, the front wheel angle sensor will indicate that the vehicle is actively making the predicted directional change when the angle changes.

3. A GPS sensor detects that the vehicle has entered or is presently located in the section of paved roadway, racetrack, or unpaved surface that the vehicle was previously predicted to travel through.

4. A camera captures an image of the field of view of the moving vehicle which is fed into an image recognition system configured to identify the location and orientation of the moving vehicle, which, in turn, is used to indicate that the vehicle has entered or is presently located in the section of paved roadway, racetrack, or unpaved surface that the vehicle was previously predicted to travel through.

5. A lidar sensor captures a representation of the field of view of the moving vehicle which is fed into a pattern recognition system configured to identify the location and orientation of the moving vehicle, which, in turn, is used to indicate that the vehicle has entered or is presently located in the section of paved roadway, racetrack, or unpaved surface that the vehicle was previously predicted to travel through.

Several predictions can be made, and the most likely prediction, or the most agreed upon prediction, is planned for implementation. For example, if there are several possible courses of travel diverging in the near future, the courses can be compared. If all but one course after the path split is quickly followed by a sharp turn to the right, a sharp turn to the right can be expected unless route popularity or another factor such as specific driver navigational instructions indicate otherwise.

In certain scenarios, the predicted directional change of the moving vehicle is not the next directional change to be performed by the moving vehicle. For example, the next directional change that the moving vehicle will encounter may not need the assistance afforded by the flywheel but a future directional change may need the assistance. This may occur if the next directional change is very slight, is banked, or involves excess traction, but the subsequent directional change is very large (much sharper) or has conditions which limit traction. Alternatively, the vehicle may need to move itself into position to make a sharp turn (with flywheel assistance) but the directional change needed to move the vehicle into this position to make the sharp turn may not need the flywheel assistance.

G. Controller Conditionally Controls the Active Element

In certain embodiments, the controller controls the active element to slow down or further spin up the flywheel after detecting initiation of the predicted directional change of the moving vehicle only when certain conditions are present. Non-exhaustive scenarios wherein the controller conditionally controls the active element are as follows:

1. The controller is further configured to detect an understeer or oversteer condition, and the controller controls the active element to slow down or further spin up the flywheel after detecting initiation of the predicted directional change of the moving vehicle only when the controller detects an understeer or oversteer condition.

2. The controller is further configured to detect a slide or drift condition, and the controller controls the active element to slow down or further spin up the flywheel after detecting initiation of the predicted directional change of the moving vehicle only when the controller detects a slide or drift condition. Sliding and drifting both involve a vehicle's tires losing traction with the road surface. Sliding is typically unintentional and is usually an unwanted event caused by loss of traction due to factors like sudden braking, cornering too fast, or driving on slippery surfaces like ice or snow. During a slide, the driver loses control of the vehicle's direction and may have difficulty regaining it potentially resulting in an accident. Slides are typically brief events that happen as the vehicle regains traction. In contrast to sliding, drifting is typically intentional and is a controlled technique where the driver deliberately breaks the traction of the rear (or all) tires in order to maintain a sideways slide through a corner. While drifting involves some loss of traction, the driver maintains control of the vehicle using techniques like counter-steering and throttle control. This allows them to maintain the slide and navigate the corner in a desired way. Drifts can be sustained for longer periods than slides and are often used in motorsports. The controller can use the flywheel to optimize drift angle, or assist in maintaining or controlling the drift.

3. The controller is further configured to monitor tire traction of the moving vehicle's tires, and the controller controls the active element to slow down or further spin up the flywheel after detecting initiation of the predicted directional change of the moving vehicle only when the controller determines that the tires of the moving vehicle have insufficient traction to successfully complete the predicted directional change of the moving vehicle.

H. Initial Spin Up of Flywheel

While the initial spin up of the flywheel is done at a slow rate, as noted above, any spinning up of the flywheel will apply some magnitude of yaw torque on the body of the moving vehicle. Accordingly, in one preferred embodiment, the initial spin up is performed only when certain conditions are present so as to minimize as much as possible any degradation in the driving performance of the moving vehicle. A non-exhaustive list of such conditions are as follows:

1. There is excess traction with respect to the vehicle.
2. No vehicle stability issues are present.
3. The vehicle is heading in a generally straight direction.
4. The vehicle is turning in a direction favorable to spin up.

I. Flywheel is not Initially Spinning

In the embodiments described above, the flywheel is initially spinning and is then slowed down or further spun up based on the predicted directional change of the moving vehicle. In another embodiment, the flywheel is not initially spinning and is initially spun up at a slow rate when a forthcoming directional change of the moving vehicle is predicted. Upon detection of initiation of the predicted directional change of the moving vehicle, the controller controls the active element to rapidly slow down the flywheel, thereby applying a yaw torque on the body of the moving vehicle during the predicted directional change of the moving vehicle.

FIG. 6A and FIG. 6B schematically illustrate this embodiment wherein a vehicle travels along a paved roadway, a racetrack, or on unpaved surface (interchangeably referred to herein as a "roadway"). The vehicle includes a flywheel (represented by a dot) and the flywheel spin direction is indicated by an arrow when viewed from above the vehicle. As discussed above, the flywheel is initially not spinning, and thus has an angular velocity of zero. A directional change of the vehicle is predicted. In FIG. 6A, the vehicle is traveling straight along the roadway, and the directional change is a sharp left curve in the roadway but it may also be a left turn. As the vehicle approaches the initiation of the sharp left curve (beginning at vehicle position 1), the flywheel is slowly spun up in a counterclockwise (looking down from above) direction during a spin up window. In FIG. 6B, the vehicle is traveling straight along the roadway, and the directional change is a sharp right curve in the roadway but it may also be a right turn. As the vehicle approaches the initiation of the sharp right curve (beginning at vehicle position 1), the flywheel is slowly spun up in a clockwise direction looking down from above during a spin up window.

The spin up window is the time period when the moving vehicle is traveling along the distance of roadway from the beginning of the spin up to the beginning of the directional change. The spin up window should be sufficiently long so as to allow for the flywheel to reach its target flywheel spin rate in a manner such that the magnitude of the yaw torque on the body of the vehicle during the spin up window will be small and unnoticeable or not disruptive to the vehicle occupants or vehicle performance.

In both FIG. 6A and FIG. 6B, when initiation of the predicted directional change of the moving vehicle is detected (vehicle position 2), the controller controls the active element to rapidly slow down the flywheel, thereby applying a yaw torque on the body of the moving vehicle during the predicted directional change of the moving vehicle, assisting the vehicle with turning in that direction.

J. Multi-Turn Scenarios

Figure 7:
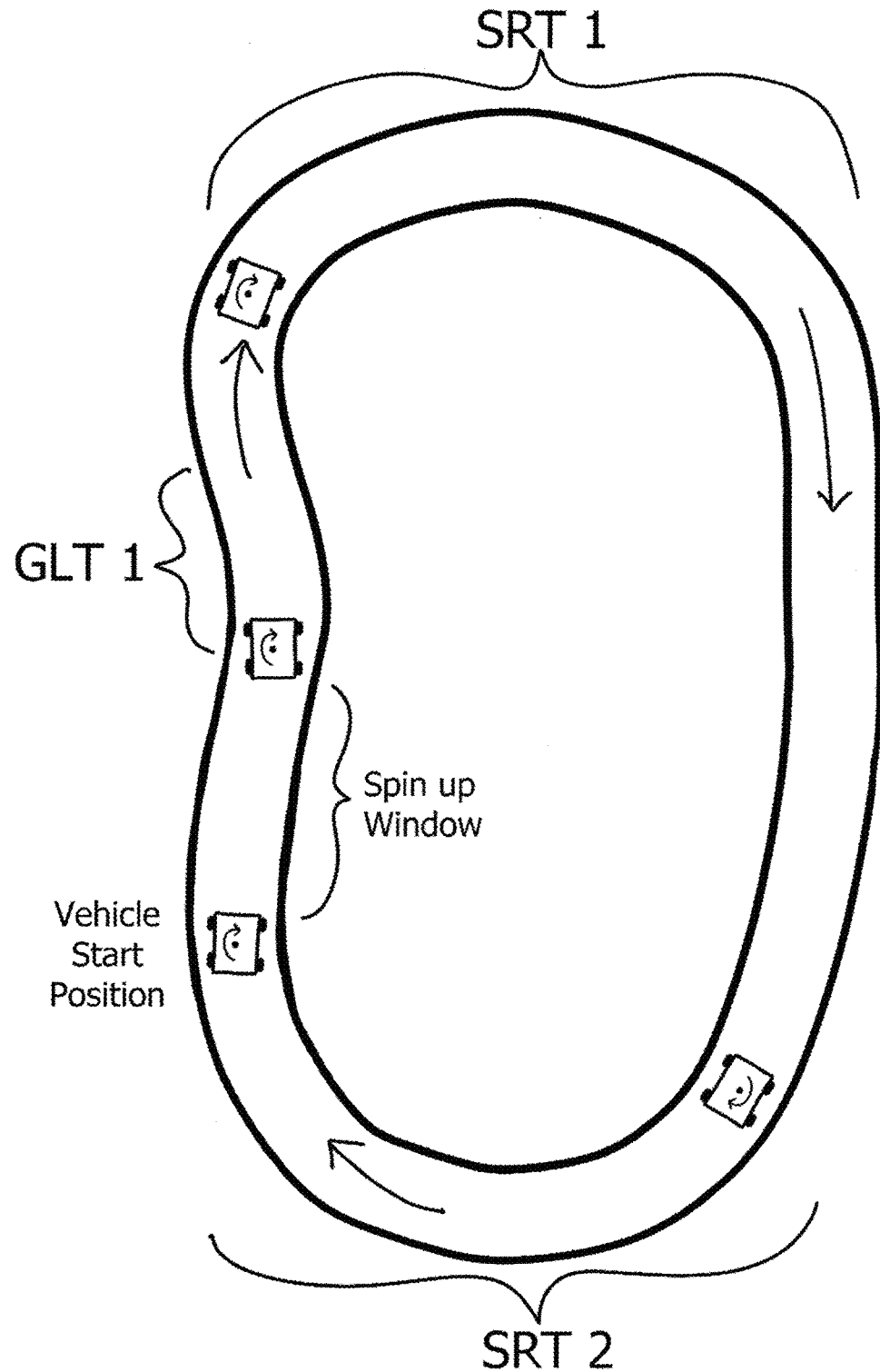
FIG. 7 is a schematic diagram of turns of a roadway and illustrates flywheel rotational movement in the vehicle as the vehicle traverses the roadway.

While the present invention may be used only one time during a vehicle trip, preferred embodiments of the present invention repeatedly use the flywheel to apply a yaw torque on the body of the moving vehicle as the vehicle is traversing its desired route. Consider, for example, a track shown in FIG. 7 which includes one gradual left turn (GLT1) and two sharp right turns (SRT1, SRT2). In this scenario, the vehicle's flywheel is slowly spun up in a clockwise (again when looking down from above) direction, such as to reach its target flywheel spin rate, in preparation for applying a yaw torque on the body of the moving vehicle during the predicted directional change of the moving vehicle associated with SRT1. When the vehicle reaches GLT1, sensor outputs of sensors in the vehicle are used by the controller to determine whether the vehicle may significantly benefit from an application of yaw torque. If so, the vehicle's flywheel is quickly further spun up in a clockwise direction. This is because GLT1 is a left turn, so the flywheel is spinning in the wrong (opposite) direction for the body of the vehicle to benefit from a rapid slowing down (e.g., braking) of the flywheel. Quickly further spinning up the flywheel in a clockwise direction can provide the beneficial application of yaw torque on the body of the moving vehicle to assist in the gentle left turn GLT1. If the controller determines that the vehicle does not need the additional yaw torque during the GLT1 gentle left turn, it may still further spin up the flywheel if the application of the yaw torque would not have excessive undesired effects, and the target spin rate has not yet been reached for later right turns. Alternatively, the controller may avoid changing the flywheel's spin rate, or may simply ignore the turn and continue any needed preparations for later turns.

When it is detected that the directional change has been initiated for SRT1 (or that it is about to happen), the flywheel is quickly slowed down (e.g., braked) to provide the beneficial application of yaw torque on the body of the moving vehicle. As the vehicle continues along its path towards SRT2, the flywheel is maintained at its current clockwise spin rate or restored to its target flywheel spin rate. When it is detected that the directional change has been initiated for SRT2 (or that it is about to happen), the flywheel is quickly slowed down again (e.g., braked again) to provide the beneficial application of yaw torque on the body of the moving vehicle.

Figure 8:
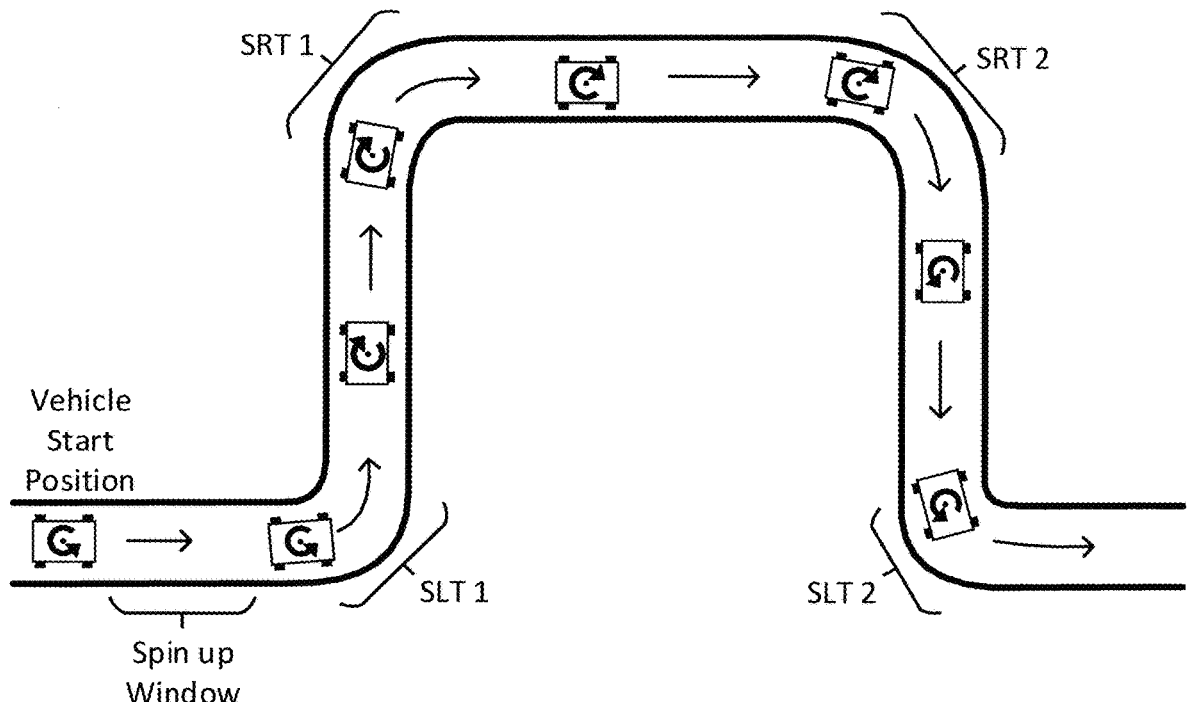
FIG. 8 is a schematic diagram of turns of a roadway and illustrates flywheel rotational movement in the vehicle as the vehicle traverses the roadway.

FIG. 8 shows another multi-turn scenario having two sharp left turns (SLT1, SLT2) and two sharp right turns (SRT1, SRT2). The order of turns is SLT1, SRT1, SRT2, and SLT2. This figure shows that the spinning direction of the flywheel is counterclockwise looking down from above in preparation for a directional change involving an upcoming left turn, and is clockwise in preparation for a directional change involving an upcoming right turn. If only a single flywheel is used, and a left turn is followed by a right turn, the spinning direction of the flywheel preferably must be reversed before the right turn is reached. Similarly, if a right turn is followed by a left turn, the spinning direction of the flywheel preferably must be reversed before the left turn is reached. If a right turn is followed by another right turn, the spinning direction of the flywheel does not need to be changed but the flywheel may need to be spun back up to its target flywheel spin rate (in the same spinning direction) to have optimal effect, before the second right turn is reached because the flywheel was slowed down during the first right turn.

K. Multi-Functional Flywheel

In addition to using the flywheel to apply a yaw torque on the body of the moving vehicle, and thereby dynamically improve its driving performance, the flywheel may also serve as a functionally useful mass in the vehicle. For example, the flywheel may be a battery for providing power to a hybrid or all-electric propulsion system of the vehicle, connected electrically through slip rings or another technology. Or it may be tied to the crankshaft of a conventional combustion engine by appropriate gearing and transmission components to smooth out the engine rotation from the firing of the pistons.

The gearing used may have a reversible direction, and the flywheel may be able to disconnect, such as via a clutch, or allowed to free-wheel when needed to allow changing the rotation rate or reversing the flywheel without impacting the engine's smooth operation or responsiveness. There may be multiple flywheels, one or more of which may be controllable. When multiple flywheels are used, individual ones may be intermittently or alternately attached to the engine.

L. Two or More Vertically Aligned Flywheels

Figure 9:
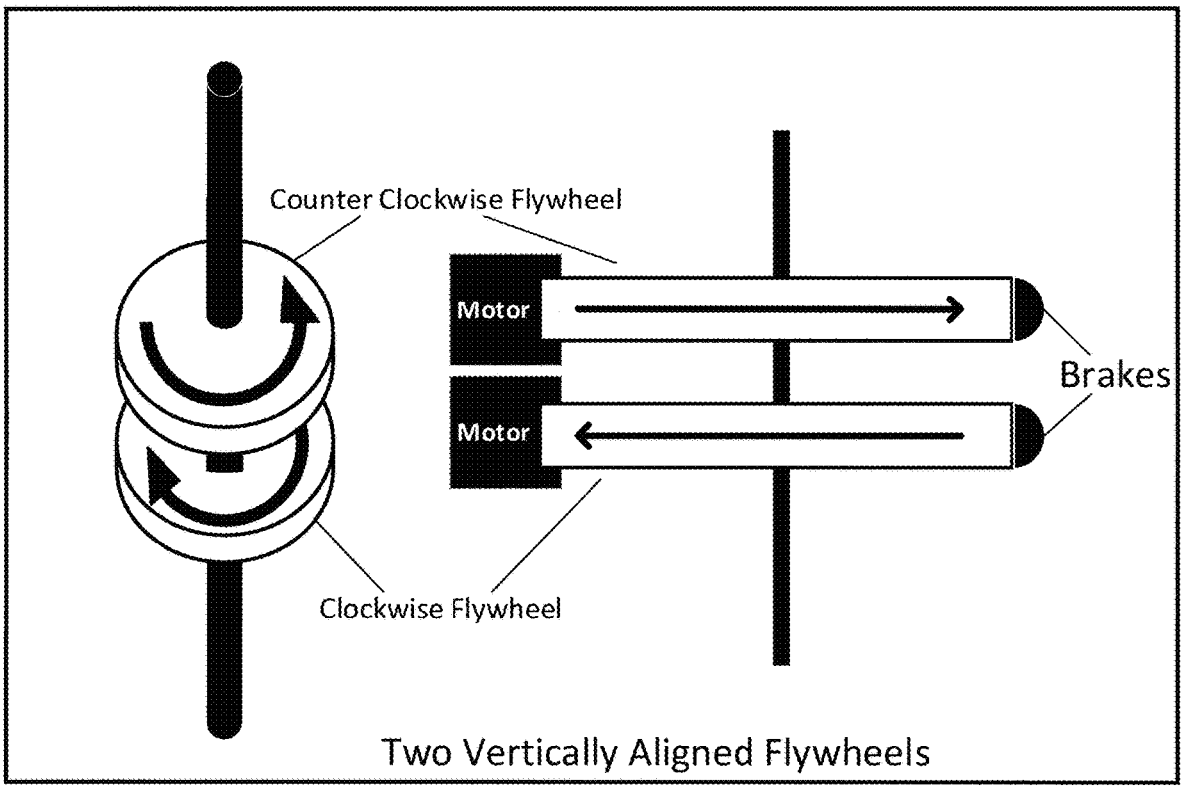
FIG. 9 shows one preferred embodiment of the present invention having two flywheels that are vertically aligned (co-axially) through their center of mass.

FIG. 9 shows one preferred embodiment having two flywheels that are vertically aligned through their center of mass. In operation, the two flywheels normally spin in opposite directions. Each flywheel ideally has its own motor (or transmission take-off from the engine) and brake. Alternatively, a motor can be shared using equipment such as clutches, gears, and belts. FIG. 9 shows two images, a schematic diagram of a 3-D view of the alignment and direction of rotation of the flywheels, and a 2-D view of the alignment and direction of rotation of the flywheels, and the individual brakes and motors of the respective flywheels.

During operation, the flywheels act together by rotating in opposite directions to cancel out the gyroscopic effects resulting from each individual flywheel, thereby reducing instability forces of the flywheel assembly on the vehicle that the flywheels are mounted in.

During operation, each of the flywheels is independently spun up. Then, one of the flywheels may be rapidly slowed down or rapidly spun up in the same manner as described above to provide the desired improved driving performance as a result of applying yaw torque on the body of the moving vehicle during the predicted directional change of the moving vehicle. In one scenario, one of the flywheels is rapidly slowed down and the other flywheel is simultaneously rapidly spun up, thereby providing increased torque application on the body of the moving vehicle compared to changing the rotation speed of only one of the flywheels.

When using multiple flywheels, each flywheel may have its own active element to spin it up. Alternatively, energy from one flywheel may be transferred to the other flywheel, as needed. Thus, one flywheel may be slowed down and the energy captured from the slowing down may be used to spin up the other flywheel. The energy transfer may occur through various methods such as generators and motors, and movable belt or gear systems that can interface with the two flywheels.

While FIG. 9 depicts only two vertically aligned flywheels spinning in opposite direction, this concept may be extended to additional pairs of vertically aligned flywheels spinning in opposite direction which may then be used to additional multiples of yaw torque application.

Referring again to FIGS. 6A and 6B, two vertically aligned flywheels spinning in opposite directions may simplify the yaw torque application because one flywheel spinning in a (clockwise looking down from above) direction, such as at the target flywheel spin rate, may be used for assisting with left turns and the other flywheel spinning in a (counterclockwise looking down from above) direction, such as at the target flywheel spin rate, may be used for assisting with right turns. The flywheel not assisting with the turn may simply be maintained at its current (e.g., target) flywheel spin rate until it is needed to assist with a future turn.

Two vertically aligned flywheels spinning in opposite directions may also simplify operation of the flywheel control process because it reduces the need to further spin up a flywheel from its existing spin rate because yaw torque may always be applied to the body of the moving vehicle by braking the other one of the spinning flywheels. Thus, each flywheel may only need to be either spun up or braked (and not further spun up), thereby simplifying the flywheel control process.

II. Additional Considerations

The following calculations are a first approximation estimate for the benefits of the preferred embodiments of the present invention. Assume that the flywheel is vertically mounted above the center of gravity (CoG) of the vehicle and that the vehicle has four wheels equally spaced from the CoG of the vehicle.

The tangential component of force required to spin up or slow down the flywheel, F, can be found by dividing the yaw torque applied to the flywheel, t, by the radius at which the force is applied, r:

$$F = \frac{\tau}{r},$$ (Equation 1)

The angular acceleration of the flywheel, a, can be found using Equation 2:

$$\alpha = \frac{Fr}{I},$$ (Equation 2)

where I is the moment of inertia of the flywheel. The angular velocity of the flywheel, w, can be found by integrating Equation 2 with respect to time. Assuming a constant force is applied, this yields Equation 3:

$$\omega = \frac{Fr}{I}t,$$ (Equation 3)

where t is the amount of time the force is applied to the flywheel. Equation 4 represents the moment of inertia of a solid disk rotating on a vertical axis through the center of the disk.

$$I = \frac{1}{2}mr^2,$$ (Equation 4)

where m is the mass of the flywheel. The angular momentum, L, of the flywheel can be found by Equation 5:

$$L=I\omega$$ (Equation 5),

Substituting Equations 3 into Equation 5 results in Equation 6:

$$L=Frt$$ (Equation 6),

The average yaw torque applied to slow down the flywheel can be found by dividing the change in angular momentum by the change in time over the active flywheel braking period.

$$\overline{\tau}_{FW} = \frac{\Delta L}{\Delta t}$$ (Equation 7)

The average tangential force applied to the flywheel, $\overline{F_{FW}}$, can be found using Equation 8:

$$\overline{F_{FW}} = \frac{\overline{\tau_{FW}}}{r_{FW}},$$ (Equation 8)

where $r_{FW}$ is the radius of the flywheel, and the force is applied at the circumference.

The torque applied to the body of the vehicle about its yaw axis through its center of gravity, $\tau_{BV}$, is equal and opposite to the torque on the flywheel. The force applied to each wheel of the vehicle, $F_{wheel}$, can be found using Equation 9:

$$F_{wheel} = \frac{\tau_{BV}}{4r_{wheel-CoG}},$$ (Equation 9)

where the radius from the wheels to the center of gravity is $r_{wheel-CoG}$. This force is directed to reorient/turn the body of the vehicle and reduces the tire traction otherwise needed for that purpose.

The distance the vehicle will travel, d, during the active duration of the applied force to the flywheel can be found using Equation 10:

$$d=vt$$ (Equation 10), where v is the vehicle's velocity assumed to be constant during the action of active element. The force of gravity, $F_{gravity}$, acting on the car is equal to the mass of the car, $m_{car}$, times the gravitational constant, g.

$$F_{gravity}=m_{car}g$$ (Equation 11)

The base level of traction the car will experience without the use of any of the preferred embodiments of the present invention, $F_{traction,base\ level}$, can be found by multiplying the force of gravity by the coefficient of static friction of the surface the car is resting on, CSF:

$$F_{traction,base\ level,wheel}=CSF\cdot F_{gravity}/4$$ (Equation 12)

The total amount of dynamical turning traction the vehicle will experience with preferred embodiments of the present invention, $F_{traction,max}$, can be found using Equation 13:

$$F_{traction,max}=F_{wheel}+F_{traction,base\ level}$$ (Equation 13)

The dynamical improvement in driving performance while the vehicle is in a turn can be approximated as a percentage by using Equation 14:

$$\text{Percent dynamical improvement} = \frac{(F_{traction,max} - F_{traction,base\ level})}{F_{traction,base\ level}} \cdot 100 \qquad \text{(Equation 14)}$$

Some example parameters in Table 1A and 1B and results in Table 2 follow. The example assumes that the flywheel is spinning and a constant force is applied to slow it to a stop.

TABLE 1A

| | | | | | Example Parameters | | | | |

| Flywheel Mass, $m_{FW}$ | Radius of Flywheel, $r_{FW}$ | Moment of Inertia of the Flywheel, I | Radius from Flywheel axis to Center of Gravity, $r_{FW-COG}$ | Radius from Wheels to Center of Gravity, $r_{wheel-COG}$ |
|---|---|---|---|---|
| 40 kg | 0.15 meter | 0.45 kg m$^2$ | 0 meters | 2 meters |

TABLE 1B

Example Parameters

| Mass of Car, $m_{car}$ | Vehicle Velocity, v | CSF | Base Level Traction per wheel, $F_{traction,base\ level}$ | Initial angular velocity, $\omega$ |
|---|---|---|---|---|
| 2500 kg 5500 lbs | $50\frac{m}{s}$ | 0.7 | 4300 N 960 lbs | 45000 RPM |
| | 112 mph | | | $4700\frac{rad}{s}$ |

TABLE 2

Example Results

| Initial Angular Momentum $L_{Initial}$ | Duration time, t | Force Applied to Flywheel, $F_{FW}$ | Force Applied to each Wheel, $F_{wheel}$ | Distance Traveled During Active Duration, d | Dynamical Improvement in Driving Performance |
|---|---|---|---|---|---|
| $2100\ kg\frac{m^2}{sec}$ | 1000 msec. | 14000 N 3150 lbs | 260 N 60 lbs. | 50 meters 165 ft | 6.3% |

Different example parameters will result in different dynamical improvements in driving performance. For example, maintaining the same applied force on the flywheel and ending with a final angular momentum which is half of the initial angular momentum will halve the duration time. The distance travelled while the dynamical improvement is applied will also be cut in half. Additionally, the flywheel may be placed in different locations in the vehicle producing vastly different results. For example, placing the flywheel over the front axle instead of the center of gravity of the vehicle will bias the generated forces from accelerating the flywheel towards the front of the vehicle.

III. Additional Embodiments

Figure 10:
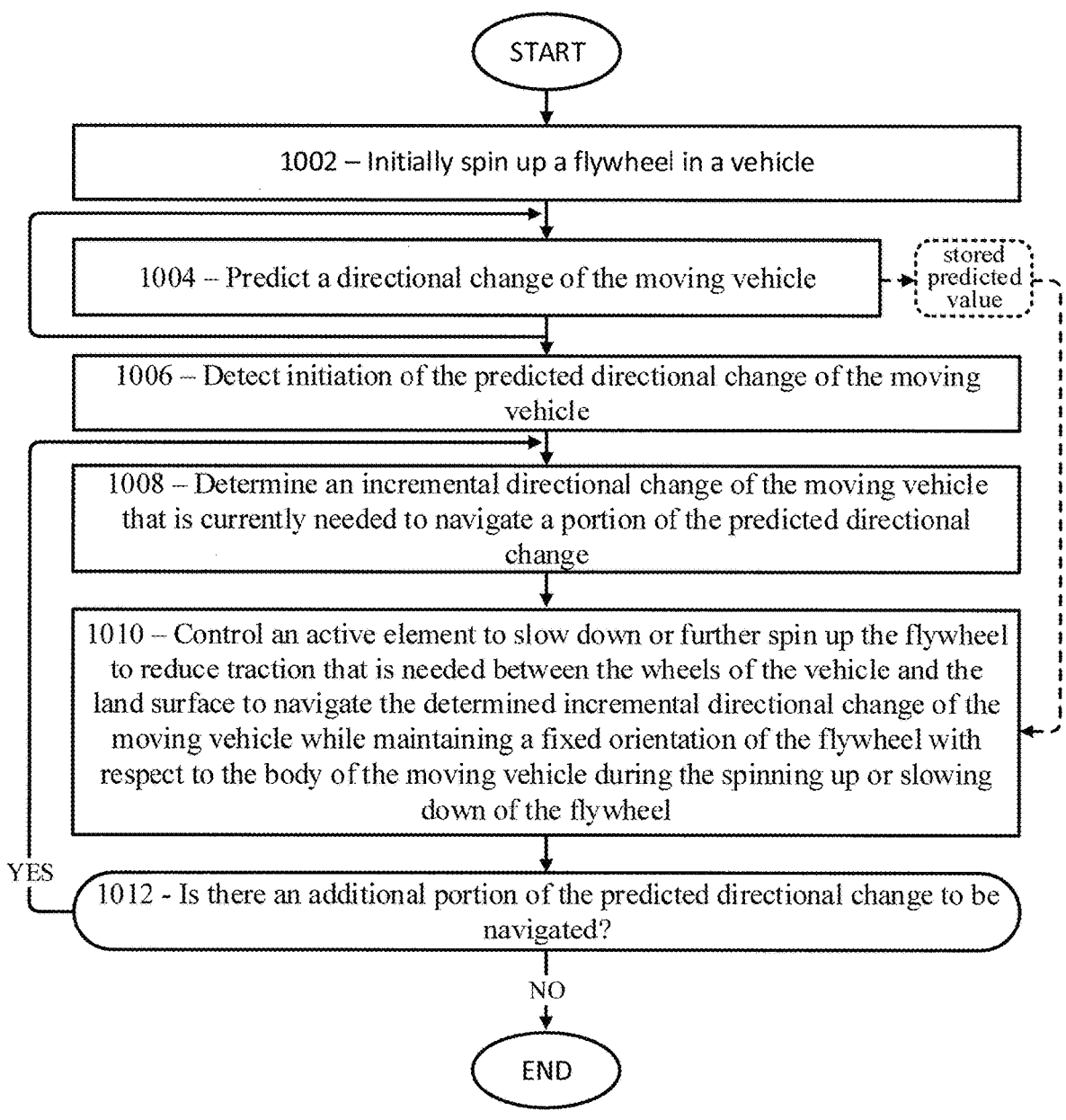

FIG. 10 is a flowchart of one alternative embodiment of the present invention. This embodiment is similar to the embodiment of FIG. 2 in that they both initially spin up a flywheel 202 in a vehicle 200, predict a directional change of the moving vehicle 200, detect initiation of the predicted directional change of the moving vehicle 200, and control an active element 204 to slow down or further spin up the flywheel 202. However, in the embodiment of FIG. 10, the actions of the active element 204 are controlled by a feedback loop that uses predicted directional change values that are continuously updated as the vehicle 200 navigates portions of the predicted directional change. More specifically, the controller 206 is further configured to predict the directional change of the moving vehicle 200, detect initiation of the predicted directional change of the moving vehicle 200, determine or estimate an incremental directional change of the moving vehicle 200 to navigate a portion of the predicted directional change, and control the active element 204. At least a portion of the predicted directional change of the moving vehicle 200 is accomplished through a plurality of incremental directional changes of the moving vehicle 200. The predicted directional change is an intended directional change. The vehicle 200 in the embodiment of FIG. 10 is a multi-track, multi-axle vehicle which is traversing the land surface.

FIG. 10 includes the following steps:

Step 1002: Initially spin up a flywheel 202 in a vehicle 200.

Step 1004: Predict the directional change of the moving vehicle 200. The current stored predicted value is stored in memory. This step operates in a continuous loop while there are additional portions of the directional change to be navigated and Step 1012 described below has not branched to END.

Step 1006: Detect initiation of the predicted directional change of the moving vehicle 200.

Step 1008: Determine or estimate the incremental directional change of the moving vehicle 200 that is currently needed to navigate a portion of the predicted directional change.

Step 1010: Control the active element 204 to slow down or further spin up the flywheel 202 to reduce traction that is needed between the wheels of the vehicle 200 and the land surface to navigate the determined or estimated incremental directional change of the moving vehicle 200 while maintaining the fixed orientation of the flywheel 202 with respect to the body of the moving vehicle 200 during the spinning up or slowing down of the flywheel 202. The torque applied by the active element 204 to slow down or further spin up the flywheel 202 is proportionate to the yaw torque applied on the body of the moving vehicle 200, and is applied in a direction that reduces the traction that is needed between the wheels of the vehicle 200 and the land surface to navigate the determined or estimated incremental directional change of the moving vehicle 200.

Step 1012: Determine or estimate if there is an additional portion of the predicted directional change to be navigated. If so, repeat steps 1008 and 1010 for subsequent portions of the predicted directional change of the moving vehicle 200. (YES output of step 1012) If it is determined or estimated that there are no additional portions of the predicted directional change to be navigated, the process ends. (NO output of step 1012).

This process dynamically improves driving performance of the moving vehicle 200 that is traversing the land surface by reducing the tire traction that the moving vehicle 200 needs to reorient the moving vehicle 200 as it traverses a turn, thereby increasing the tire traction available to the moving vehicle 200 to be used for braking, accelerating, or navigating the turn.

Figure 11:
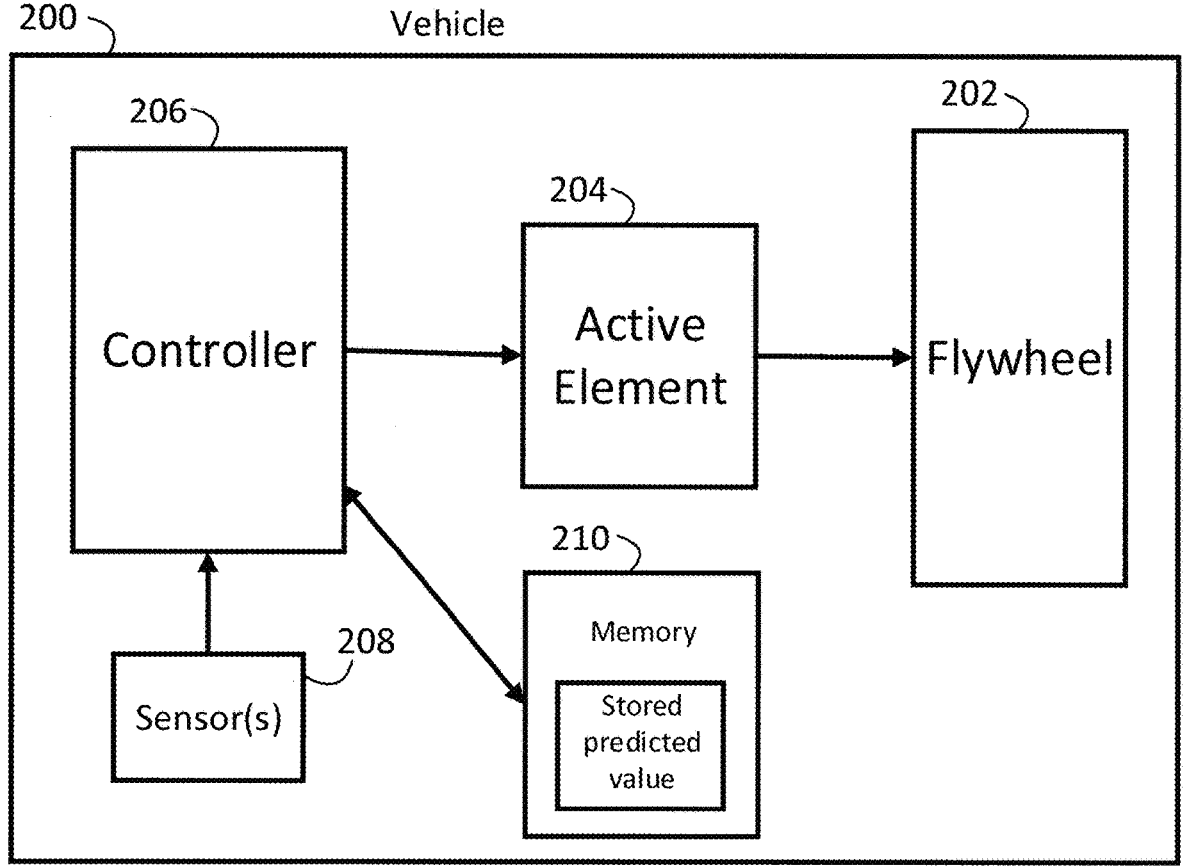
FIG. 11 is a schematic diagram of apparatus elements in a vehicle in accordance with the preferred embodiment of FIGS. 10, 12, and 13.

The embodiment of FIG. 10 relies upon the same apparatus elements as shown in FIG. 4, except that there is an additional memory (storage) element, memory 210, that stores the continuously updated "stored predicted value" as illustrated in FIG. 11.

In one alternative embodiment of FIG. 10, the controller 206 controls the active element 204 to slow down the flywheel 202 after detecting initiation of the predicted directional change of the moving vehicle 200. The active element 204 may include a brake. If so, in step 1010, the controller 206 controls the active element 204 to slow down the flywheel 202 after detecting initiation of the predicted directional change of the moving vehicle 200 using the brake.

In another alternative embodiment of FIG. 10, the flywheel 202 is initially spinning as a result of being spun up at a first rate, and the flywheel 202 is slowed down in step 1010 at a second rate, wherein the magnitude of the second rate is at least ten times greater than the magnitude of the first rate.

In another alternative embodiment of FIG. 10, in step 1010, the active element 204 further spins up the flywheel 202 after detecting initiation of the predicted directional change of the moving vehicle 200. In one example, the flywheel 202 is initially spinning as a result of being spun up at a first rate, and the flywheel 202 is further spun up in step 1010 at a second rate, and the magnitude of the second rate is at least ten times greater than the magnitude of the first rate.

In another alternative embodiment of FIG. 10, the predicted directional change of the moving vehicle 200 is not the next directional change to be performed by the moving vehicle 200.

In another alternative embodiment of FIG. 10, prior to step 1010, torque is applied to the initially spinning flywheel 202 by using the controller 206 to control the active element 204 to reach a target flywheel spin rate.

In another alternative embodiment of FIG. 10, the flywheel 202 is initially spinning at a target flywheel spin rate, and in step 1010, the active element 204 slows down or further spins up the flywheel 202 from the target flywheel spin rate.

In another alternative embodiment of FIG. 10, the controller 206 is further configured to detect an understeer or oversteer condition, and step 1010 is performed only when the controller detects an understeer or oversteer condition.

In another alternative embodiment of FIG. 10, the controller 206 is further configured to detect a slide condition, and step 1010 is performed only when the controller 206 detects a slide condition.

In another alternative embodiment of FIG. 10, the controller 206 is further configured to monitor tire traction of the moving vehicle's tires, and step 1010 is performed only when the controller 206 determines or estimates that the tires of the moving vehicle 200 have insufficient traction to successfully complete the predicted directional change of the moving vehicle 200.

In another alternative embodiment of FIG. 10, the active element 204 includes multiple, independently controllable components, and the flywheel 202 is initially spun up using one of the multiple, independently controllable components, and step 1010 is performed using another one of the multiple, independently controllable components.

In another alternative embodiment of FIG. 10, the vehicle 200 further includes a sensor 208, and an output of the sensor 208 is used by the controller 206 to detect initiation of the predicted directional change of the moving vehicle 200.

In another alternative embodiment, the flywheel 202 has an orientation that is permanently fixed with respect to both the body of the moving vehicle 200 and the land surface, including during the spinning up or slowing down of the flywheel 202, and in step 1010, the active element 204 slows down or further spins up the flywheel 202 after detecting initiation of the predicted directional change of the moving vehicle 200 while maintaining the permanently fixed orientation of the flywheel 202 with respect to both the body of the moving vehicle 200 and the land surface, including during the spinning up or slowing down of the flywheel 202.

FIG. 12 is a flowchart of another alternative embodiment of the present invention. This embodiment is similar to one of the embodiments of FIG. 2 in that they both initially spin up a flywheel 202 in a vehicle 200, predict a directional change of the moving vehicle 200, detect initiation of the predicted directional change of the moving vehicle 200, and control an active element 204 to slow down the flywheel 202. However, in the embodiment of FIG. 12, similar to the embodiment of FIG. 10, the actions of the active element 204 are controlled by a feedback loop that uses predicted directional change values that are continuously updated as the vehicle 200 navigates portions of the predicted directional change. More specifically, the controller 206 is further configured to predict the directional change of the moving vehicle 200, detect initiation of the predicted directional change of the moving vehicle 200, determine or estimate an incremental directional change of the moving vehicle 200 to navigate a portion of the predicted directional change, and control the active element 204. At least a portion of the predicted directional change of the moving vehicle 200 is accomplished through a plurality of incremental directional changes of the moving vehicle 200. The predicted directional change is an intended directional change. The vehicle 200 in the embodiment of FIG. 12 is a multi-track, multi-axle vehicle which is traversing the land surface.

FIG. 12 includes the following steps:

Step 1202: Initially spin up a flywheel 202 in a vehicle 200 at a first rate to a target flywheel spin rate.

Step 1204: Predict the directional change of the moving vehicle 200. The current stored predicted value is stored in memory. This step operates in a continuous loop while there are additional portions of the directional change to be navigated and Step 1212 described below has not branched to END.

Step 1206: Detect initiation of the predicted directional change of the moving vehicle 200.

Step 1208: Determine or estimate the incremental directional change of the moving vehicle 200 that is currently needed to navigate a portion of the predicted directional change.

Step 1210: Control the active element 204 to slow down the flywheel 202 at a second rate from the target flywheel spin rate to reduce traction that is needed between the wheels of the vehicle 200 and the land surface to navigate the determined or estimated incremental directional change of the moving vehicle 200 while maintaining the fixed orientation of the flywheel 202 with respect to the body of the moving vehicle 200 during the spinning up or slowing down of the flywheel 202. The torque applied by the active element 204 to slow down or further spin up the flywheel 202 is proportionate to the yaw torque applied on the body of the moving vehicle 200, and is applied in a direction that reduces the traction that is needed between the wheels of the vehicle 200 and the land surface to navigate the determined or estimated incremental directional change of the moving vehicle 200. The magnitude of the second rate is at least ten times greater than the magnitude of the first rate.

Step 1212: Determine or estimate if there is an additional portion of the predicted directional change to be navigated. If so, repeat steps 1208 and 1210 for subsequent portions of the predicted directional change of the moving vehicle 200. (YES output of step 1212) If it is determined or estimated that there are no additional portions of the predicted directional change to be navigated, the process ends. (NO output of step 1212).

The embodiment of FIG. 12 relies upon the same apparatus elements as shown in FIG. 4, except that there is an additional memory (storage) element, memory 210, that stores the continuously updated "stored predicted value" as illustrated in FIG. 11.

In one alternative embodiment of FIG. 12, the vehicle 200 further includes a sensor 208, and an output of the sensor 208 is used by the controller 206 to detect initiation of the predicted directional change of the moving vehicle 200.

In another alternative embodiment of FIG. 12, the flywheel 202 has an orientation that is permanently fixed with respect to both the body of the moving vehicle 200 and the land surface during the initial spinning up of the flywheel 202, and in step 1210, the controller 206 controls the active element 204 to slow down the flywheel 202 at the second rate from the target flywheel spin rate after detecting initiation of the predicted directional change of the moving vehicle 200 while maintaining the permanently fixed orientation of the flywheel 202 with respect to both the body of the moving vehicle 200 and the land surface, including during the slowing down of the flywheel 202.

Figure 13:
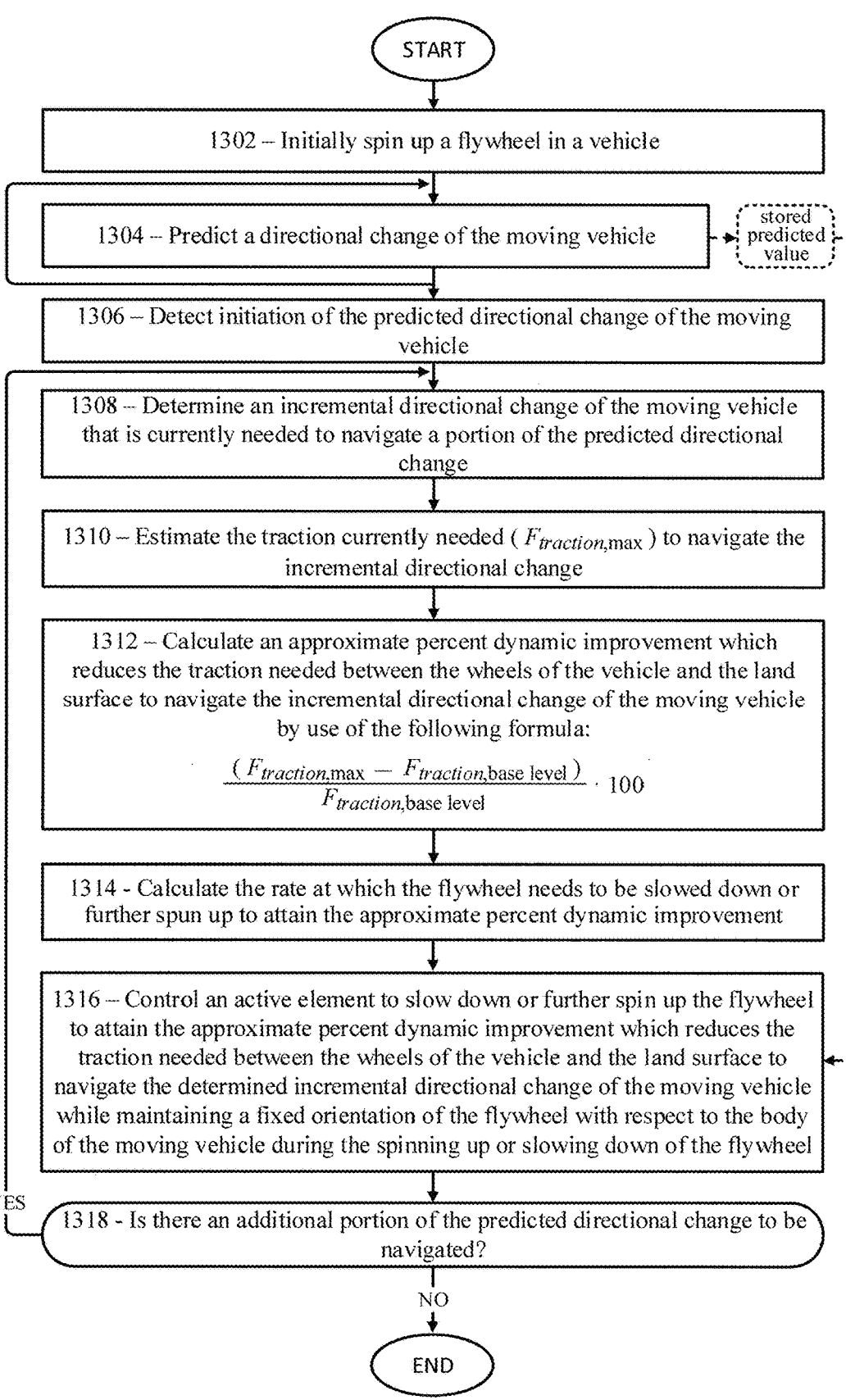

FIG. 13 is a flowchart of another alternative embodiment of the present invention. This embodiment is similar to one of the embodiments of FIG. 2 in that they both initially spin up a flywheel 202 in a vehicle 200, predict a directional change of the moving vehicle, detect initiation of the predicted directional change of the moving vehicle, and control an active element 204 to slow down the flywheel. However, in the embodiment of FIG. 13, similar to the embodiment of FIG. 10, the actions of the active element 204 are controlled by a feedback loop that uses predicted directional change values that are continuously updated as the vehicle navigates portions of the predicted directional change. More specifically, the controller 206 is further configured to predict the directional change of the moving vehicle 200, detect initiation of the predicted directional change of the moving vehicle 200, determine or estimate an incremental directional change of the moving vehicle 200 to navigate a portion of the predicted directional change, and control the active element 204. At least a portion of the predicted directional change of the moving vehicle 200 is accomplished through a plurality of incremental directional changes of the moving vehicle 200. The predicted directional change is an intended directional change. Furthermore, in the embodiment of FIG. 13, specific estimates and calculations are performed in determining how to control the active element 204. The vehicle in the embodiment of FIG. 13 is a multi-track, multi-axle vehicle which is traversing the land surface.

FIG. 13 includes the following steps:

Step 1302: Initially spin up a flywheel 202 in a vehicle 200.

Step 1304: Predict the directional change of the moving vehicle 200. The current stored predicted value is stored in memory. This step operates in a continuous loop while there are additional portions of the directional change to be navigated and Step 1212 described below has not branched to END.

Step 1306: Detect initiation of the predicted directional change of the moving vehicle 200.

Step 1308: Determine or estimate the incremental directional change of the moving vehicle 200 that is currently needed to navigate a portion of the predicted directional change.

Step 1310: Determine or estimate the traction currently needed to navigate the incremental directional change ($F_{traction,max}$).

Step 1312: Calculate an approximate percent dynamic improvement which reduces the traction needed between the wheels of the vehicle 200 and the land surface to navigate the incremental directional change of the moving vehicle 200 by use of the following formula:

$$\frac{(F_{traction,max} - F_{traction,base\ level})}{F_{traction,base\ level}} \cdot 100$$

wherein $F_{traction,base\ level}$ is the base level traction that exists between the wheels of the vehicle 200 and the land surface prior to the controller 206 controlling the active element 204 for the current incremental directional change.

Step 1314: Calculate the rate at which the flywheel 202 needs to be slowed down or further spun up to attain the approximate percent dynamic improvement.

Step 1316: Control the active element 204 to slow down or further spin up the flywheel 202 to attain the approximate percent dynamic improvement which reduces the traction needed between the wheels of the vehicle 200 and the land surface to navigate the determined or estimated incremental directional change of the moving vehicle 200 while maintaining the fixed orientation of the flywheel 202 with respect to the body of the moving vehicle 200 during the spinning up or slowing down of the flywheel 202. The torque applied by the active element 204 to slow down or further spin up the flywheel 202 is proportionate to the yaw torque applied on the body of the moving vehicle 200, and is applied in a direction that reduces the traction that is needed between the wheels of the vehicle 200 and the land surface to navigate the determined or estimated incremental directional change of the moving vehicle 200.

Step 1318: Determine or estimate if there is an additional portion of the predicted directional change to be navigated. If so, repeat steps 1308 through 1316 for subsequent portions of the predicted directional change of the moving vehicle 200. (YES output of step 1318) If it is determined or estimated that there are no additional portions of the predicted directional change to be navigated, the process ends. (NO output of step 1318).

Instead of expressing the approximate dynamic improvement as a percentage as shown above, the approximate dynamic improvement may alternatively be represented as an amount, as follows:

$$\frac{(F_{traction,max} - F_{traction,base\ level})}{F_{traction,base\ level}}$$

The embodiment of FIG. 13 relies upon the same apparatus elements as shown in FIG. 4, except that there is an additional memory (storage) element, memory 210, that stores the continuously updated "stored predicted value" as illustrated in FIG. 11.

The embodiment of FIG. 13 may further include the same alternative embodiments that are described above with respect to FIG. 10, except that for certain alternative embodiments of FIG. 10 that reference Step 1010 (controlling of the active element 204), this step would be Step 1316 in the respective alternative embodiments of FIG. 13.

IV. Additional Considerations

A. Multi-Track Vehicles

A multi-track vehicle is generally defined as a vehicle that leaves two or more distinct ground tracks as it moves forward. This distinguishes it from a single-track vehicle (like a bicycle or motorcycle), where the front and rear wheels essentially follow the same line, leaving a single track. Key points about multi-track vehicles include the following:

A. Wheels: They typically have at least one axle with more than one wheel (e.g., a car, truck, or quad-bike).

B. Tracks: When driven, such as through snow or mud, they leave multiple parallel tracks on the ground.

C. Handling: They are engineered to corner by rolling flat or slightly outward, transferring load to the outside wheels, unlike single-track vehicles which lean into a turn.

In engineering and vehicle dynamics, models used to study cars often simplify them to "two-track" or "multi-axle" models, which are types of multi-track vehicles.

B. Predicting a Directional Change of a Moving Vehicle

As stated earlier, the predicted directional change of the moving vehicle may include both (i) desired directional changes and (ii) reactionary directional changes. There is no redefinition of the term "predict" implied from the common definition. Specifically, the disclosure above states that "There are multiple, different scenarios where the controller predicts that the moving vehicle will make a directional change," and provides several scenarios. Some of the scenarios are a result of desired directional changes, for example, a driver turning the steering wheel, and a sensor providing input to the controller that the steering wheel has turned the wheels of the car, and the controller predicts that the moving vehicle will turn in a certain direction. Other scenarios are a result of undesired directional changes where the vehicle might slip on ice and start skidding, and in this case, sensors detect the skid, orientation of the vehicle, position of the serring wheel, and other factors and the controller predicts that the moving vehicle will make a directional change. The controller then determines or estimates the incremental directional change of the moving vehicle that is currently needed to navigate a portion of the predicted directional change. Note that the incremental directional change of the moving vehicle that is currently needed to navigate a portion of the predicted directional change is not necessarily along the path of the predicted undesired directional change as the undesired directional change is not likely the directional change needed to successfully navigate a turn, for example, without crashing. That is, a driver trying to recover from an undesired directional change will likely turn their steering wheel in a direction to attempt to successfully navigate a turn after an undesired directional change.

C. Dynamics Details

Multiple incremental directional changes are needed as a moving vehicle traverses a predicted directional change of a turn. Accordingly, a feedback loop is required to continually determine or estimate the next incremental directional change of the moving vehicle that is currently needed to navigate the next portion of the predicted directional change, while taking into account the real-world effects and side-effects of previous incremental directional changes. The controller activates the active element to slow down or further spin up the flywheel to reduce traction that would otherwise be needed between the wheels of the vehicle and the land surface to navigate the next determined or estimated incremental directional change of the moving vehicle.

The controller calculates the dynamic improvement from the action of the active element on the flywheel to reduce the traction otherwise needed to navigate the turn. The result is that the controller in its feedback loop uses available information, including sensor inputs, to update its determinations or estimations that the moving vehicle will turn by a certain amount in a certain direction as a result of actions of the active element. The controller also updates the current and future incremental directional changes needed by the moving vehicle.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of dynamically improving driving performance of a moving vehicle which is traversing a land surface, the vehicle including (i) a flywheel oriented in a direction with respect to a body of the vehicle such that spinning up or slowing down of the flywheel applies a yaw torque on the body of the moving vehicle, wherein the flywheel has an orientation that is fixed with respect to the body of the moving vehicle during the spinning up or slowing down of the flywheel, and wherein the flywheel is initially spinning, (ii) an active element that controls the flywheel, the active element being configured to apply torque to spin up or slow down the flywheel, and (iii) a controller configured to (A) predict a directional change of the moving vehicle, (B) detect initiation of the predicted directional change of the moving vehicle, (C) determine or estimate an incremental directional change of the moving vehicle to navigate a portion of the predicted directional change, and (D) control the active element, wherein at least a portion of the predicted directional change of the moving vehicle is accomplished through a plurality of incremental directional changes of the moving vehicle, and wherein the vehicle is a multi-track, multi-axle vehicle, and wherein the predicted directional change is an intended directional change, the method comprising:

(a) predicting, by the controller, the directional change of the moving vehicle;

(b) detecting, by the controller, initiation of the predicted directional change of the moving vehicle;

(c) determining or estimating, by the controller, the incremental directional change of the moving vehicle that is currently needed to navigate a portion of the predicted directional change;

(d) controlling, by the controller, the active element to slow down or further spin up the flywheel to reduce traction that is needed between the wheels of the vehicle and the land surface to navigate the determined or estimated incremental directional change of the moving vehicle while maintaining the fixed orientation of the flywheel with respect to the body of the moving vehicle during the spinning up or slowing down of the flywheel, wherein the flywheel is initially spinning as a result of being spun up at a first rate, and wherein the flywheel is slowed down or further spun up at a second rate, and wherein the magnitude of the second rate is at least ten times greater than the magnitude of the first rate, wherein the torque applied by the active element to slow down or further spin up the flywheel is (i) proportionate to the yaw torque applied on the body of the moving vehicle, and (ii) is applied in a direction that reduces the traction that is needed between the wheels of the vehicle and the land surface to navigate the determined or estimated incremental directional change of the moving vehicle; and (e) repeating steps (c)-(d) for subsequent portions of the predicted directional change of the moving vehicle, thereby dynamically improving driving performance of the moving vehicle that is traversing the land surface.

2. The method of claim 1 wherein in step (d) the controller controls the active element to slow down the flywheel after detecting initiation of the predicted directional change of the moving vehicle.

3. The method of claim 2 wherein the active element includes a brake, and wherein in step (d) the controller controls the active element to slow down the flywheel using the brake after detecting initiation of the predicted directional change of the moving vehicle.

4. The method of claim 1 wherein in step (d) the controller controls the active element to further spin up the flywheel after detecting initiation of the predicted directional change of the moving vehicle.

5. The method of claim 1 wherein the predicted directional change of the moving vehicle is not the next directional change to be performed by the moving vehicle.

6. The method of claim 1 further comprising:

(f) prior to step (d), applying torque to the initially spinning flywheel by using the controller to control the active element to reach a target flywheel spin rate.

7. The method of claim 1 wherein the flywheel is initially spinning at a target flywheel spin rate, and wherein in step (d) the active element slows down or further spins up the flywheel from the target flywheel spin rate.

8. The method of claim 1 wherein the controller is further configured to (E) monitor tire traction of the moving vehicle's tires, and wherein step (d) is performed only when the controller determines or estimates that the tires of the moving vehicle have insufficient traction to successfully complete the predicted directional change of the moving vehicle.

9. The method of claim 1 wherein the vehicle further includes (iv) a sensor, and wherein an output of the sensor is used by the controller to detect initiation of the predicted directional change of the moving vehicle.

10. The method of claim 1 wherein the flywheel has an orientation that is permanently fixed with respect to the body of the moving vehicle, including during the spinning up or slowing down of the flywheel, and wherein step (d) further comprises controlling, by the controller, the active element to slow down or further spin up the flywheel after detecting initiation of the predicted directional change of the moving vehicle while maintaining the permanently fixed orientation of the flywheel with respect to the body of the moving vehicle, including during the spinning up or slowing down of the flywheel.

11. The method of claim 1 wherein the predicted directional change is an upcoming directional change.

12. A method of dynamically improving driving performance of a moving vehicle which is traversing a land surface, the vehicle including (i) a flywheel oriented in a direction with respect to a body of the vehicle such that spinning up or slowing down of the flywheel applies a yaw torque on the body of the moving vehicle, wherein the flywheel has an orientation that is fixed with respect to the body of the moving vehicle during the spinning up or slowing down of the flywheel, (ii) an active element that controls the flywheel, the active element being configured to apply torque to spin up or slow down the flywheel, and (iii) a controller configured to (A) predict a directional change of the moving vehicle, (B) detect initiation of the predicted directional change of the moving vehicle, (C) determine or estimate an incremental directional change of the moving vehicle to navigate a portion of the predicted directional change, and (D) control the active element, wherein at least a portion of the predicted directional change of the moving vehicle is accomplished through a plurality of incremental directional changes of the moving vehicle, and wherein the vehicle is a multi-track, multi-axle vehicle, and wherein the predicted directional change is an intended directional change, the method comprising:

(a) initially spinning up the flywheel in the moving vehicle at a first rate to a target flywheel spin rate;

(b) predicting, by the controller, the directional change of the moving vehicle;

(c) detecting, by the controller, initiation of the predicted directional change of the moving vehicle;

(d) determining or estimating, by the controller, the incremental directional change of the moving vehicle that is currently needed to navigate a portion of the predicted directional change;

(e) controlling, by the controller, the active element to slow down the flywheel at a second rate from the target flywheel spin rate to reduce traction that is needed between the wheels of the vehicle and the land surface to navigate the determined or estimated incremental directional change of the moving vehicle while maintaining the fixed orientation of the flywheel with respect to the body of the moving vehicle during the slowing down of the flywheel, wherein the magnitude of the second rate is at least ten times greater than the magnitude of the first rate, and wherein the torque applied by the active element to slow down the flywheel is (i) proportionate to the yaw torque applied on the body of the moving vehicle, and (ii) is applied in a direction that reduces the traction that is needed between the wheels of the vehicle and the land surface to navigate the determined or estimated incremental directional change of the moving vehicle; and (f) repeating steps (d)-(e) for subsequent portions of the predicted directional change of the moving vehicle, thereby dynamically improving driving performance of the moving vehicle that is traversing the land surface.

13. The method of claim 12 wherein the vehicle further includes (iv) a sensor, and wherein an output of the sensor is used by the controller to detect initiation of the predicted directional change of the moving vehicle.

14. The method of claim 12 wherein the flywheel has an orientation that is permanently fixed with respect to the body of the moving vehicle during the initial spinning up of the flywheel, and wherein in step (e), the controller controls the active element to slow down the flywheel at the second rate from the target flywheel spin rate after detecting initiation of the predicted directional change of the moving vehicle while maintaining the permanently fixed orientation of the flywheel with respect to the body of the moving vehicle, including during the slowing down of the flywheel.

15. The method of claim 12 wherein the predicted directional change is an upcoming directional change.

16. A method of dynamically improving driving performance of a moving vehicle which is traversing a land surface, the vehicle including (i) a flywheel oriented in a direction with respect to a body of the vehicle such that spinning up or slowing down of the flywheel applies a yaw torque on the body of the moving vehicle, wherein the flywheel has an orientation that is fixed with respect to the body of the moving vehicle during the spinning up or slowing down of the flywheel, and wherein the flywheel is initially spinning, (ii) an active element that controls the flywheel, the active element being configured to apply torque to spin up or slow down the flywheel, and (iii) a controller configured to (A) predict a directional change of the moving vehicle, (B) detect initiation of the predicted directional change of the moving vehicle, (C) determine or estimate an incremental directional change of the moving vehicle to navigate a portion of the predicted directional change, and (D) control the active element, wherein at least a portion of the predicted directional change of the moving vehicle is accomplished through a plurality of incremental directional changes of the moving vehicle, and wherein the vehicle is a multi-track, multi-axle vehicle, and wherein the predicted directional change is an intended directional change, the method comprising:

(a) predicting, by the controller, the directional change of the moving vehicle;

(b) detecting, by the controller, initiation of the predicted directional change of the moving vehicle;

(c) determining or estimating, by the controller, the incremental directional change of the moving vehicle that is currently needed to navigate a portion of the predicted directional change;

(d) estimating, by the controller, the traction currently needed to navigate the incremental directional change ($F_{traction,max}$);

(e) calculating, by the controller, an approximate dynamic improvement amount which reduces the traction needed between the wheels of the vehicle and the land surface to navigate the incremental directional change of the moving vehicle by use of the following formula:

$$\frac{(F_{traction,max} - F_{traction,base\ level})}{F_{traction,base\ level}}$$

wherein $F_{traction,base\ level}$ is the base level traction that exists between the wheels of the vehicle and the land surface prior to the controller controlling the active element for the current incremental directional change;

(f) calculating, by the controller, the rate at which the flywheel needs to be slowed down or further spun up to attain the approximate dynamic improvement amount;

(g) controlling, by the controller, the active element to slow down or further spin up the flywheel to attain the approximate dynamic improvement amount which reduces the traction needed between the wheels of the vehicle and the land surface to navigate the determined or estimated incremental directional change of the moving vehicle while maintaining the fixed orientation of the flywheel with respect to the body of the moving vehicle during the spinning up or slowing down of the flywheel, wherein the torque applied by the active element to slow down or further spin up the flywheel is (I) proportionate to the yaw torque applied on the body of the moving vehicle, and (II) is applied in a direction that reduces the traction that is needed between the wheels of the vehicle and the land surface to navigate the determined or estimated incremental directional change of the moving vehicle; and (h) repeating steps (c)-(g) for subsequent portions of the predicted directional change of the moving vehicle, thereby dynamically improving driving performance of the moving vehicle that is traversing the land surface.

17. The method of claim 16 wherein in step (g) the controller controls the active element to slow down the flywheel after detecting initiation of the predicted directional change of the moving vehicle.

18. The method of claim 17 wherein the active element includes a brake, and wherein in step (g) the controller controls the active element to slow down the flywheel using the brake after detecting initiation of the predicted directional change of the moving vehicle.

19. The method of claim 16 wherein in step (g) the controller controls the active element to further spin up the flywheel after detecting initiation of the predicted directional change of the moving vehicle.

20. The method of claim 19 wherein the flywheel is initially spinning as a result of being spun up at a first rate, and wherein the flywheel is further spun up in step (g) at a second rate, and wherein the magnitude of the second rate is at least ten times greater than the magnitude of the first rate.

21. The method of claim 16 wherein the predicted directional change of the moving vehicle is not the next directional change to be performed by the moving vehicle.

22. The method of claim 16 further comprising:

(i) prior to step (g), applying torque to the initially spinning flywheel by using the controller to control the active element to reach a target flywheel spin rate.

23. The method of claim 16 wherein the flywheel is initially spinning at a target flywheel spin rate, and wherein in step (g) the active element slows down or further spins up the flywheel from the target flywheel spin rate.

24. The method of claim 16 wherein the controller is further configured to (E) monitor tire traction of the moving vehicle's tires, and wherein step (g) is performed only when the controller determines or estimates that the tires of the moving vehicle have insufficient traction to successfully complete the predicted directional change of the moving vehicle.

25. The method of claim 16 wherein the vehicle further includes (iv) a sensor, and wherein an output of the sensor is used by the controller to detect initiation of the predicted directional change of the moving vehicle.

26. The method of claim 16 wherein in step (a), the prediction of the directional change of the moving vehicle is repeatedly updated for use in step (g).

27. The method of claim 16 wherein the predicted directional change is an upcoming directional change.

* * * * *